US011663265B2

(12) United States Patent
Lin et al.

(10) Patent No.: US 11,663,265 B2
(45) Date of Patent: May 30, 2023

(54) ENHANCED IMAGE SEARCH VIA CONTROLLABLE ATTRIBUTES

(71) Applicant: Adobe Inc., San Jose, CA (US)

(72) Inventors: Zhe Lin, Bellevue, WA (US); Shabnam Ghadar, Menlo Park, CA (US); Saeid Motiian, San Francisco, CA (US); Ratheesh Kalarot, San Jose, CA (US); Baldo Faieta, San Francisco, CA (US); Alireza Zaeemzadeh, Oviedo, FL (US)

(73) Assignee: Adobe Inc., San Jose, CA (US)

(*) Notice: Subject to any disclaimer, the term of this patent is extended or adjusted under 35 U.S.C. 154(b) by 73 days.

(21) Appl. No.: 17/104,745

(22) Filed: Nov. 25, 2020

(65) Prior Publication Data

US 2022/0164380 A1    May 26, 2022

(51) Int. Cl.
*G06F 16/583* (2019.01)
*G06F 16/532* (2019.01)
*G06N 20/00* (2019.01)
*G06F 16/54* (2019.01)
*G06F 16/56* (2019.01)
*G06F 16/538* (2019.01)

(52) U.S. Cl.
CPC .......... *G06F 16/583* (2019.01); *G06F 16/532* (2019.01); *G06F 16/538* (2019.01); *G06F 16/54* (2019.01); *G06F 16/56* (2019.01); *G06N 20/00* (2019.01)

(58) Field of Classification Search
CPC ...... G06F 16/583; G06F 16/538; G06F 16/54; G06F 16/532; G06F 16/56; G06F 16/50; G06N 20/00

See application file for complete search history.

(56) References Cited

U.S. PATENT DOCUMENTS 10,503,908 B1 * 12/2019 Bellis ............... G06F 21/577
10,552,471 B1 *  2/2020 Dandekar .......... G06F 16/56
10,621,268 B1 *  4/2020 Batruni ............. G06F 17/10
(Continued)

OTHER PUBLICATIONS

Karras Tero; et al., "Analyzing and Improving the Image Quality of StyleGAN", arXiv:1912.04958v2, Mar. 23, 2020, 21 pages.
(Continued)

*Primary Examiner* — Vaishali Shah
(74) *Attorney, Agent, or Firm* — Finch & Maloney PLLC

(57) ABSTRACT

A query image is received, along with a query to initiate a search process to find other images based on the query image. The query includes a preference value associated with an attribute, the preference value indicative of a level of emphasis to be placed on the attribute during the search. A full query vector, which is within a first dimensional space and representative of the query image, is generated. The full query vector is projected to a reduced dimensional space having a dimensionality lower than the first dimensional space, to generate a query vector. An attribute direction corresponding to the attribute is identified. A plurality of candidate vectors of the reduced dimensional space is searched, based on the attribute direction, the query vector, and the preference value, to identify a target vector of the plurality of candidate vectors. A target image, representative of the target vector, is displayed.

20 Claims, 9 Drawing Sheets
(3 of 9 Drawing Sheet(s) Filed in Color)

(56) References Cited

U.S. PATENT DOCUMENTS

2014/0153832 A1\* 6/2014 Kwatra .................. G06T 11/00
                                                   382/195
2016/0337226 A1\* 11/2016 Padala .................. G06N 7/005
2018/0121796 A1\* 5/2018 Deisher ................ G06N 3/0472
2018/0348998 A1\* 12/2018 Mueller .................. G06K 9/00
2019/0354609 A1\* 11/2019 Huang .................. G06F 16/56
2020/0073968 A1\* 3/2020 Zhang ..................... G06N 3/08
2021/0279952 A1\* 9/2021 Chen ...................... G06T 17/00
2021/0343392 A1\* 11/2021 Neumann .............. G16H 50/20

OTHER PUBLICATIONS

"StyleGAN", retrieved from the Internet: https://en.wikipedia.org/wiki/StyleGAN [Nov. 24, 2020], 3 pages.

\* cited by examiner

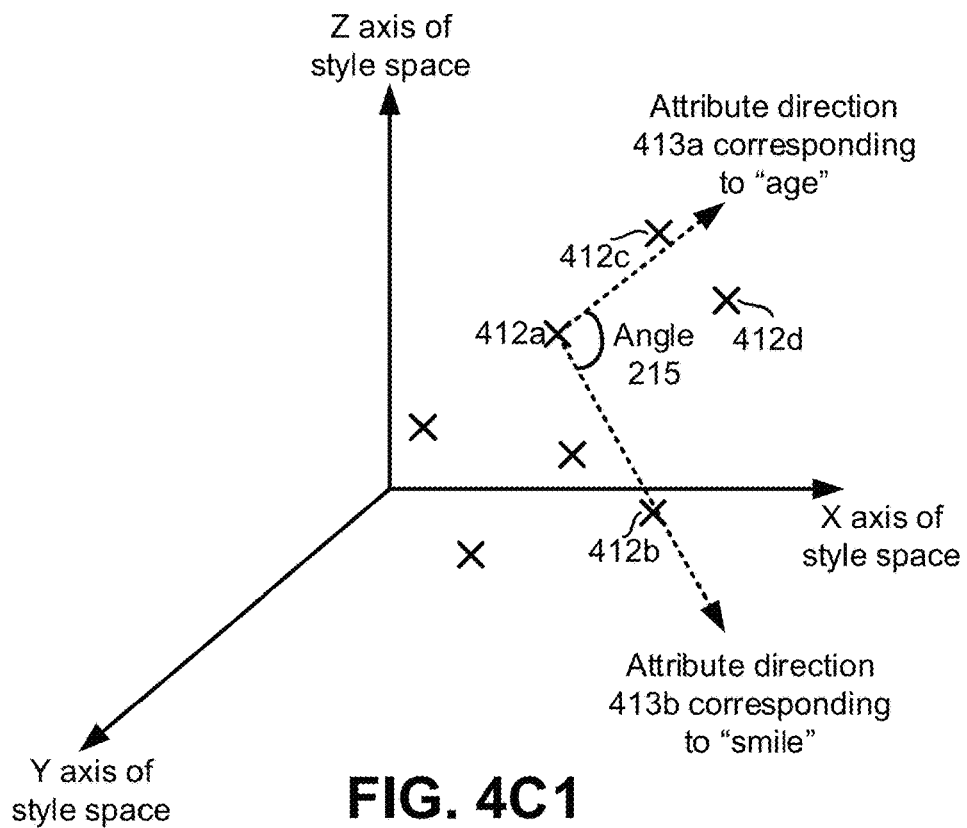
FIG. 4C1
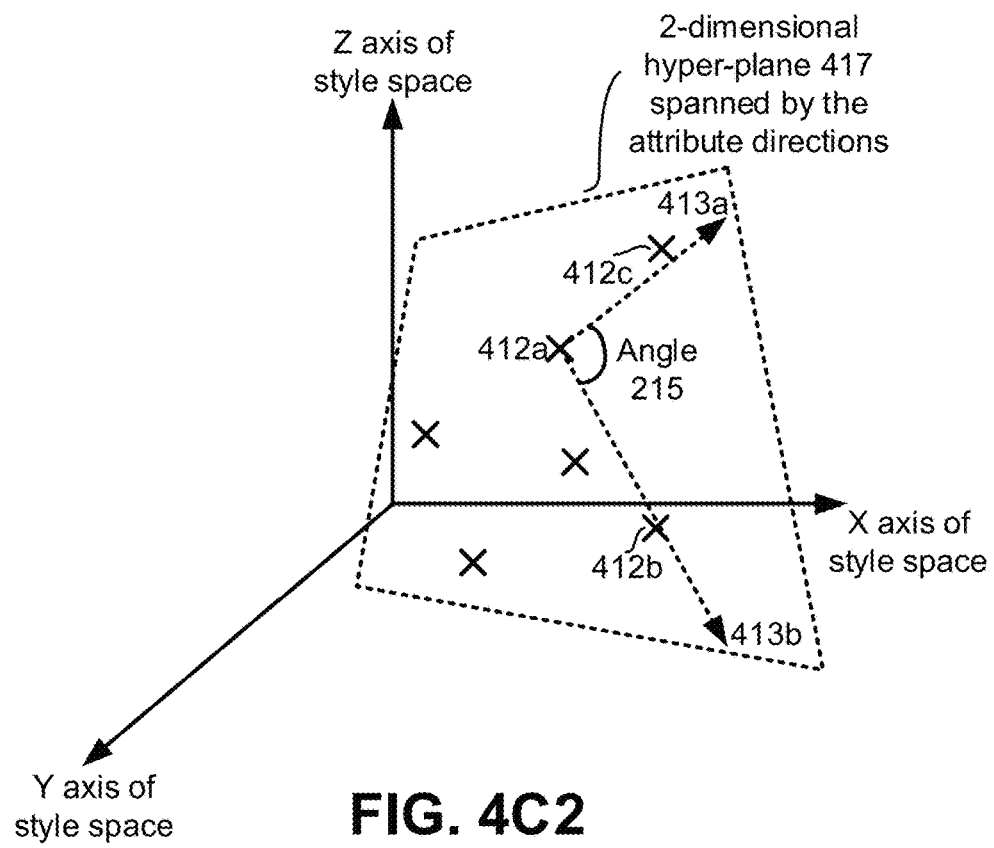
FIG. 4C2

ENHANCED IMAGE SEARCH VIA CONTROLLABLE ATTRIBUTES

FIELD OF THE DISCLOSURE

This disclosure relates generally to digital images, and more specifically to techniques for searching digital images.

BACKGROUND

Image-based searching (also sometimes referred to as "reverse image searching") is becoming increasingly popular, with advent of high computing power machines. For example, given a query image, an image search system can find other images that are similar to the query image. This allows a user to discover images that are related to, or similar to, the specific query image. Such image-based searching is not to be confused with face retrieval techniques, which search an image database with a query face to identify other images that include that same face (same person). However, there remain a number of non-trivial issues with respect to image-based search, as will be appreciated in light of this disclosure. For example, it is not possible to tune search attributes over a range of possible options, so as to fine tune search results.

SUMMARY

Techniques are disclosed for performing an enhanced image search. For example, a method for performing the enhanced image search comprises receiving a query image, along with a query to initiate a search process to find other images based on the query image. In an example, the query includes a preference value associated with an attribute, where the preference value is indicative of a level of emphasis to be placed on the attribute during the search process. A full query vector, which is representative of the query image, is generated. The full query vector is within a first dimensional space. The full query vector is projected to a reduced dimensional space having a dimensionality lower than the first dimensional space, to generate a query vector. An attribute direction in the reduced dimensional space, which corresponds to the attribute, is identified. In some examples, a characteristic of the attribute changes along the attribute direction in the reduced dimensional space. A plurality of candidate vectors of the reduced dimensional space is searched, based on (i) the attribute direction, (ii) the query vector, and (iii) the preference value associated with the attribute, to identify a target vector included in the plurality of candidate vectors, the target vector representative of a corresponding target image. The target image is finally displayed.

In another example, a system for searching images based on a query image is disclosed. The system comprises one or more processors, and an image search system executable by the one or more processors to receive the query image, along with a query to initiate a search process to find other images based on the query image. The query comprises (i) an identification of an attribute, (ii) a preference value indicating a level of emphasis to be placed on the attribute during the search, and (iii) an intensity value indicating a characterization of the attribute during the search process. The image search system is further to generate a query vector representative of the query image, and modify the query vector based on the intensity value. The query vector, as modified, at least in part reflects the characterization of the attribute as indicated by the intensity value. The image search system is further to search a plurality of candidate search vectors, based on (i) the query vector as modified, and (ii) the preference value associated with the attribute, to identify a target search vector corresponding to a target image within a search database. The image search system is further to cause display of the target image.

In another example, a computer program product including one or more non-transitory machine-readable mediums encoded with instructions is disclosed. The instructions, when executed by one or more processors, cause a process to be carried out. The process includes, for each training image of a plurality of training images, generating a corresponding training vector of a first dimensional space, to provide a plurality of training vectors. The process further includes using the plurality of training vectors, training a machine learning module to assign, to each of a plurality of attributes, a corresponding attribute direction of a plurality of attribute directions within the first dimensional space. In some examples, at least one attribute direction of the plurality of attribute directions is orthogonal to at least one or more other attribute directions. In some such examples, one or more attribute directions of the plurality of attribute directions has a sparsity below a threshold level. In some such examples, a characteristics of a first attribute changes along a corresponding first attribute direction, and where a characteristics of a second attribute does not change along the first attribute direction.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4C1 illustrates an example simplified version of a style space W and two example attribute directions, in accordance with some embodiments of the present disclosure.

FIG. 4C2 illustrates a 2-dimensional (2D) hyperplane that is spanned by two example attribute directions, in accordance with some embodiments of the present disclosure.

DETAILED DESCRIPTION

Figure 1:
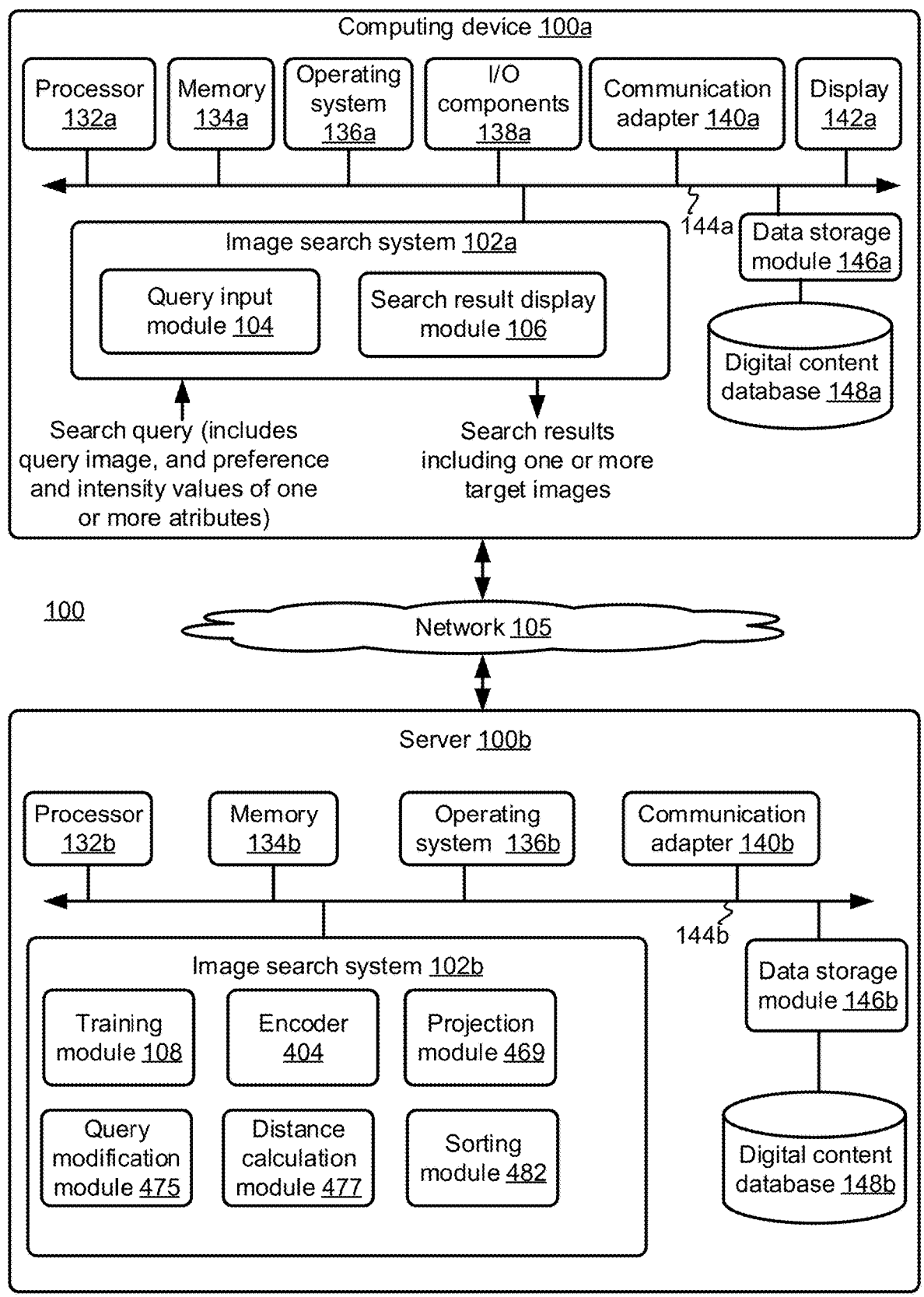
FIG. 1 is a block diagram schematically illustrating selected components of an example system comprising a computing device communicating with server device(s), where the combination of the computing device and the server device(s) are configured to provide an enhanced image search process, in which an image database is searched to find images that are at least in part similar to a query image, wherein various attributes or features within the images to be searched can be independently controlled, in accordance with some embodiments of the present disclosure.

Techniques are disclosed for performing enhanced image searches, where the user can indicate, as a part of the search query, emphasis levels and/or characterizations of one or more attributes to be searched, along with the query image. For example, in some embodiments, for each attribute, a corresponding preference value and a corresponding intensity value is user configurable. The preference value associated with an attribute is indicative of a level of emphasis or importance to be placed on the attribute during the search process, and the intensity value associated with the attribute is indicative of a characterization of the attribute that is to be searched. Each of the preference value and the intensity value is a continuous variable, where the user can fine tune these values, over a predefined range of values, for individual attributes. Furthermore, the attributes can be controlled independent of each other. For example, each attribute is associated with a corresponding attribute direction, where the attribute directions of various attributes are orthogonal to each other. Thus, the user can independently control the preference and/or intensity values of various attributes. Numerous configurations will be appreciated.

In some embodiments, the search is performed by encoding the query image to a corresponding full query vector, where the full query vector is-R within a full dimensional style space. Similarly, various candidate images within a search database are also mapped to corresponding full candidate vectors in the full dimensional style space. The search system is trained to find a reduced dimension space that retains attribute information of the full dimensional style space, where the reduced dimension space has lower dimensionality than the full dimensional style space, so as to facilitate efficient (faster) search. Accordingly, the full query vector and the full candidate vectors are projected on the reduced dimension space, to generate a corresponding query vector and candidate vectors in the reduced dimension space. Prior to the search, the query vector can be modified using the intensity value provided by the user (searcher), such that attribute characteristics specified by the intensity value are searched. Subsequently, the query vector is compared to various candidate vectors in the reduced dimension space, and where the comparison process is weighted using the preference values for various attributes. The final search results, which are generated based on the preference and/or the intensity values of various attributes, are then output for display or otherwise provided to the user.

General Overview

As previously explained, image-based search fails to provide users with control over attributes of images to be searched. For example, assume a scenario where a query image includes a face with a neutral expression (e.g., neither happy nor sad). The user wants to find digital images having the same or a similar face as the query image, but with a slightly more "happy expression." However, because the user cannot readily provide or otherwise convey a desired degree of happiness (or a desired degree of facial expression) as a search attribute, a given image search system will at best output search results that include images with neutral expression (e.g., based on the query image having the neutral expression). The image search system does not allow the user to specify, control or otherwise fine tune any facial expression, or a degree of happiness expressed in the happy expression. Nor can the user conduct a search that puts greater emphasis on some search criteria, and some but less emphasis on other search criteria.

Thus, techniques are provided herein to perform enhanced image searches, where the user can indicate, as a part of the search query, emphasis levels and/or characterizations of one or more attributes, along with the query image. Specifically, and according to some example embodiments, for each attribute, the user can select a corresponding preference value and a corresponding intensity value. The preference value associated with an attribute is indicative of a level of emphasis or importance to be placed on the attribute during the search process, and the intensity value associated with the attribute is indicative of a characterization of the attribute that is to be searched. For example, assume an attribute "facial expression" has a corresponding user-provided preference value and a corresponding intensity value. The preference value indicates how important the attribute "facial expression" is in the search process. The preference value does not indicate whether it is desirable that the search results include a sad face, happy face, or neutral face—rather, the preference value indicates a degree of emphasis or importance to be placed on the "facial expression" attribute during the search process. The preference value is a continuous variable, where the user can fine tune the value of the preference value. For example, if a zero emphasis is placed on this attribute, the search process will be agnostic to this attribute, and the search results will include happy face, sad face, and/or neutral face. The intensity value, on the other hand, characterizes the "facial expression" attribute. For example, the intensity value indicates whether it is desirable that the images in the search results include, for example, slightly happy expression (e.g., closed-lip smile), happy expression (e.g., laughing smile), slightly sad expression (e.g., no tears), sad expression (e.g., tears), or neutral expression. Note that the intensity value is also a continuous variable, where the user can fine-tune, for instance, a degree of happiness or a degree of sadness associated with the facial expression. For example, if relatively high emphasis is placed on the "facial expression" attribute and the intensity value indicates "happy face", the search results will only or primarily include happy faces (e.g., assuming that such happy faces are available in the search database). Furthermore, the attributes can be controlled independent of each other. For example, as will be discussed in detail in turn, each attribute is associated with a corresponding attribute direction, where the attribute directions of various attributes are orthogonal. Thus, the user can independently fine-tune preference and/or intensity values of various attributes, and fine-tuning an attribute does not affect the search process for a different attribute.

In some embodiments, the search is performed by encoding the query image to a corresponding "full" query vector. Various candidate images within a search database are also mapped to corresponding "full" candidate vectors. The term "full" here implies that a dimension of the space, in which the full query vector and the full candidate vectors reside, is relatively large or full, and has not been reduced. This full dimensional space is also referred to herein as a style space W, because the style or attribute information of an image is preserved by the corresponding full vector in this style space. In some embodiments, the search system is trained to find attribute directions in this full dimensional style space W. For example, as one traverses along the attribute direction of a specific attribute, characteristics of the specific attribute (and only the specific attribute, and not any other attributes) change. For example, as one moves along an attribute direction of an "age" attribute, only the age of the faces with the images in the style space W changes, without any change in other attributes. This is due to the orthogonality constraint on the attributes. A sparsity constraint is also imposed on the attributes, e.g., to make navigation along the attribute directions relatively computationally less intensive. In some examples, the dimensionality of the style space W can be too large, and the search system is trained to find a reduced dimension space that retains all relevant information of the full dimensional style space W. Prior to the actual search, the query vector can be modified using the intensity value, such that attribute characteristics specified by the intensity value are searched. Subsequently, the query vector is compared to various candidate vectors in the reduced dimension space, where the candidate vectors are searched using the above discussed preference values. For example, during the comparison, contributions of individual attributes are weighted, based on the preference value. The final search results, which are generated based on the preference and/or the intensity values of various attributes, are then output for display.

In further detail, and according to some example embodiments, an image search system performs the enhanced search operation. During a training phase of the image search system, a training module of the image search system receives a plurality of training images, and generates a plurality of full training vectors in the full dimensional style space W corresponding to a plurality of training images. As discussed, the word "full" used with respect to the training vector and the dimension is used to contrast these from a "reduced" training vector and "reduced" dimension discussed herein later. For example, an encoder maps a training image to a corresponding full training vector in the full dimensional style space W. The full training vector retains style information (such as attribute information and identity information) of the corresponding training image. In some embodiments, an inverse function of synthesis network stages of a Style Generative Adversarial Network (Style-Gan) is used to implement the encoder. The training images are based on the type of image search to be conducted by the search system. For example, if the search system is to be trained for facial search (e.g., searching faces of a person), the training images can include faces of human. In some implementations, the style space W is a high dimensional space having, for example, 512×18, or 9216 dimensions. A number of attributes Nf can be, for example, 10, 20, 30, 40 or another appropriate number. The number of attributes Nf is much less, e.g., 1% or less than a dimension of the style space W.

An attribute direction determination module of the image search system is trained to assign, to each of a plurality of attributes, a corresponding attribute direction within the style space W, such that (i) the attribute directions are orthogonal to each other, and (ii) the attribute directions have a sparsity below a threshold level. For example, as one traverses along an attribute direction of an example attribute "age," the age of the faces of the images in the style space W increases correspondingly, and vice versa. In another example, similarly, as one traverses along an attribute direction corresponding to "smile," the attribute "smile" in the face in the corresponding training images increases, and vice versa. The two attribute directions corresponding to age and smile are orthogonal to each other. This ensures that the attributes age and smile are independent of each other. That is, traversing along the age attribute direction varies only the age, and not the smile attribute. Similarly, traversing along the smile attribute direction varies only the smile, and not the age attribute. Having orthogonal attribute directions disentangles the attributes, meaning that changing one attribute in the search query (such as the age) does not affect other attributes (such as the smile). Put differently, due to the orthogonality, a characteristic of a first attribute changes along a corresponding first attribute direction, but a characteristic of a second attribute (or any other attributes) does not change along the first attribute direction.

In some examples, to enforce orthogonality, the attribute direction determination module of the training module is trained to detect attribute directions in the style space W. For example, the style space W, in some examples, is 9216-dimensional, whereas there may be a much lower number of attributes, such as 20, 30, 40, or another appropriate number of attributes. The attribute direction determination module analyses the full training vectors corresponding to the training images, to determine a direction in which a specific attribute vary, and assigns the direction to the corresponding attribute. Thus, a plurality of attributes is assigned a corresponding plurality of attribute directions. The attribute directions, as determined by the attribute direction determination module, can be orthogonal to each other. If the attribute directions are not fully orthogonal, after determining the attribute directions, the attribute direction determination module replaces the attribute directions with their closest set of orthogonal vectors.

As also discussed, the attribute directions have a sparsity below a threshold level. For example, to enforce sparsity, the attribute direction determination module tries to find the attribute directions that have only a few nonzero entries. In other words, the sparsity ensures that the search system is able to manipulate the attributes linearly (e.g., by changing an attribute characteristics via traversing in the attribute direction), by only changing a few of the entries in a full training vector. The sparsity enforcement can be effective in reducing correlation among attributes, as each attribute direction is only impacting a tiny subset of the entries. Enforcement of sparsity will be discussed in further detail herein in turn.

As discussed, the dimension of the style space W, in which the full training vectors are generated, is relatively high (such as 9216 in some examples), which can be prohibitively large for efficient storage and real-time search in some examples. So, the training module arms to reduce a size of the style space W to a subspace (e.g., a most relevant subspace) that contains substantially all the necessary information, without impacting the search performance. The relevant subspace of the style space W is subspace spanned by the learned attribute directions, as they contain information on the attributes of interest. In an example, to preserve information on the identity of the facial images, additional dimensions (e.g., in addition to the learned attribute directions) of the style space W and/or an identity descriptor is used.

For example, as discussed, there are attributes such as age, gender, beard, glasses, and assume there are Nf number of such learned attributes, and corresponding Nf number of orthogonal attribute directions determined by the attribute direction determination module. To find the most relevant subspace, the training module undertakes a data-driven approach, and searches in the relevant subspace (referred to herein as reduced dimensional subspace) that contains most of the energy of the dataset comprising the training vectors. In some embodiments, this reduced dimensional subspace spans the attributes directions, and is also spanned by first Nd singular vectors of the dataset embedded in the style space W, after ignoring the information represented by the attribute directions. The Nd singular vectors are calculated by decomposing the dataset (e.g., comprising the full training vectors) using Singular Value Decomposition (SVD). Mathematically speaking, given a full training vector w and a set of orthogonal attribute directions fi, i=0, . . . , Nf, the full training vector w can be projected onto the subspace spanned by the attribute directions using a matrix multiplication Fw, where each row of the matrix F contains a corresponding attribute direction fi. Furthermore, (I−F).w=w−F.w provides a residual vector, which is a representation of the full training vector w in the subspace not spanned by the attribute directions, where/is the identity matrix. Therefore, the most relevant residual subspace (e.g., the reduced dimensional subspace) can be determined by selecting the Nd most dominant singular vectors of the residual vectors. This generates a Nd dimensional subspace that contains most of the energy of the residual vectors, and is orthogonal to the Nf dimensional subspace spanned by the attribute directions. Thus, the size of the final reduced dimensional subspace of interest has a dimension of at least (Nf+Nd). In some examples, for most datasets, most of the energy of the residual style vectors, e.g. 99%, is concentrated in a very small subspace of the style space W. In an example where the style space W has a size of 18×512, or 9216, the number Nd is selected to be 128. If there are, for example, 50 learned attributes (e.g., Nf=50), then there are (50+128), or about 178 dimensions in the reduced dimensional subspace. In some such example cases, the reduced dimensional subspace has about 1% or less dimensions than the full-dimensional style space W.

In some other example cases, the identity of the person in the image is preserved using an identity descriptor, e.g., instead of (or in addition to) the Nd number of subspaces. For example, once a person or a face in an image is identified (e.g., using an appropriate face detection model), a corresponding identity descriptor is assigned to the face. Thus, the above discussed Nd dimensions in the reduced dimensional subspace are not used in some such embodiments, and the reduced dimensional subspace spans only the Nf dimensional learned attribute directions.

After the reduced dimensional subspace is determined, the search system is now trained for the search process. The search system now enters a search database preparation phase, in which a search database is populated with candidate image vectors corresponding to a plurality of candidate images, according to some such embodiments. For example, the search system receives a plurality of candidate images that form a search database. The candidate images can be collected from any appropriate source, e.g., from the Internet or public sources, from users submitting candidate images, and/or any other appropriate manner in which the candidate images can be collected. The search system (such as the above discussed encoder) generates, for each candidate image, a corresponding full candidate vector, to provide a plurality of full candidate vectors corresponding to the plurality of candidate image. The encoder transforms a candidate image from an image space to the full dimensional style space W. A full candidate vector is a vector representation of a corresponding candidate image, and retains attribute and identity information of the candidate image.

A projection module of the search system generates, for each full candidate vector, a corresponding candidate vector, by projecting the full candidate vector to the reduced dimensional space, thereby providing a plurality of candidate vectors corresponding to the plurality of candidate images. For example, the projection module receives information about the reduced dimension space from the training module. As discussed, the reduced dimension space has a reduced dimension (e.g., Nf+Nd) relative to the full dimensional style space W. The projection module maps a full candidate vector (e.g., which has the dimensions of the full dimensional style space W) to the candidate vector (e.g., which has the dimensions of the reduced dimensional space). In some examples, the candidate vectors are stored in a digital content database, which forms a search database.

The search system subsequently enters a search or query phase, according to some such embodiments. For example, the search system receives an image search query that includes the query image, and a preference value and an intensity value corresponding to one or more attributes. The search system (such as the encoder) generates, for the query image, a corresponding full query vector. As discussed, the full query vector is a vector representation of the query image, and retains attribute and identity information of the query image. The projection module generates, for the full query vector, a corresponding query vector, by projecting the full query vector to the reduced dimensional space.

In some embodiments, the query vector is modified (e.g., by a query modification module of the search system), based on one or more intensity values corresponding to one or more corresponding attributes, to generate a modified query vector. For example, consider the scenario where the user wants the search results to be happy smiling faces, but the query face is neutral (e.g., neither happy, nor sad). In such case, penalizing this neutral face attribute (which will be discussed herein later) during the search process populates the search results with both happy and sad faces (e.g., anything, but a neutral face). On the other hand, ignoring the neutral face attribute (which will also be discussed herein later) will populate the search results with neutral, sad, and happy faces. Thus, penalizing or ignoring the neutral face attribute does not necessarily populate the search results with happy faces. In some embodiments, to have happy faces in the search requests, the query vector itself is modified, to reflect a happy face. Thus, the modification operation changes the query vector itself, thereby effectively changing the query image that is to be searched.

The search system then generates a direction matrix F, which includes one or more attribute directions (generated by the training module) corresponding to one or more attributes in the reduced dimensional space. A distance calculation module of the search system then calculates, for each candidate vector k, a corresponding distance $d_k$, based on (i) the identified one or more attribute directions, (ii) the modified query vector, and (iii) the preference values associated with the one or more attribute, as will be discussed in further detail herein in turn. For example, each distance $d_k$ includes a first term representing a distance corresponding to the identity similarity between a modified query vector $w^q$ and a $k^{th}$ candidate vector $w^k$. Identity information represents an identity of a person, whose face is displayed in a corresponding image. Thus, if the first term is small, this implies that the two faces in the query image and the $k^{th}$ candidate image can possibly belong to the same person (e.g., same or similar identity) or a person having a similar face.

Each distance dk further includes a second term representing a weighted distance between the vectors $w^q$ and $w^k$ corresponding to each attribute. For example, this second term, in essence, is a summation of distances between the vectors $w^q$ and $w^k$ along the various attribute directions. The second term is weighted by a weightage matrix A, where the matrix A is a diagonal matrix having non-zero and/or zero diagonal entries, and having zero non-diagonal entries. The weightage matrix A is a diagonal NfxNf matrix, e.g., having Nf number of rows and columns. Each diagonal entry of the matrix A includes a corresponding weight α associated with a corresponding attribute. For example, a first diagonal entry is a weight α1 associated with a corresponding first attribute, a second diagonal entry is a weight α2 associated with a corresponding second attribute, and so on. Thus, by manipulating the values of α, the contribution of different attributes in the distance metric dk can be controlled, as will be discussed in further detail herein in turn.

For example, each weight α is based on the previously discussed preference values of various attributes. Based on the preference value associated with an $i^{th}$ attribute (e.g., which can be set by the user, or can have a default value of 0), a corresponding weight αi is adjusted, e.g., to emphasize, ignore, or penalize an attribute. For example, an $i^{th}$ attribute can be emphasized by setting the corresponding weight αi to be greater than zero. The $i^{th}$ attribute can be ignored during the search process, by setting the corresponding weight αi to zero. Similarly, the $i^{th}$ attribute can be penalized in the search process by setting the corresponding weight αi to be less than zero. It may be noted that the weightage matrix A can be used to emphasize (or de-emphasize, or ignore) multiple attributes simultaneously. For example, a first weight α1 is set to a first value and a second weight α2 is set to a second value, thereby setting various emphasis levels to the first and second attributes in a different manner.

Once the distances corresponding to the various candidate images are calculated, the search system (e.g., a sorting module of the search system) sorts the distances, and selects one or more candidate vectors having lowest corresponding distances as target candidate vectors. For example, a distance dk being relatively small is indicative of the corresponding $k^{th}$ candidate vector being closer to the modified query vector, after taking into account the weightage matrix A and the direction matrix F. Hence, one or more candidate vectors having lowest corresponding distances are selected as target candidate vectors. Subsequently, the search system causes display of one or more candidate images corresponding to the one or more target candidate vectors, thereby completing the search process.

System Architecture

FIG. 1 is a block diagram schematically illustrating selected components of an example system 100 comprising a computing device 100a communicating with server device(s) 100b, where the combination of the computing device 100a and the server device(s) 100b (henceforth also referred to generally as server 100b) are configured to provide an enhanced image search process, in which an image database is searched to find images that are at least in part similar to a query image, wherein various attributes or features within the images to be searched can be independently controlled, in accordance with some embodiments of the present disclosure. As can be seen, the device 100a includes an image search system 102a (also referred to as system 102a) and the server 100b includes an image search system 102b (also referred to as system 102b), which allows the system 100 to search for images, while emphasizing (or deemphasizing or ignoring) attributes of the images to be searched, as well as controlling characterization of the searched attributes, as will be discussed in turn.

As will be appreciated, the configuration of the device 100a may vary from one embodiment to the next. To this end, the discussion herein will focus more on aspects of the device 100a that are related to searching images, and less so on standard componentry and functionality typical of computing devices. The device 100a comprises, for example, a desktop computer, a laptop computer, a workstation, an enterprise class server computer, a handheld computer, a tablet computer, a smartphone, a set-top box, a game controller, and/or any other computing device that can initiate an image search and cause display of one or more search results.

In the illustrated embodiment, the device 100a includes one or more software modules configured to implement certain functionalities disclosed herein, as well as hardware configured to enable such implementation. These hardware and software components may include, among other things, a processor 132a, memory 134a, an operating system 136a, input/output (I/O) components 138a, a communication adaptor 140a, data storage module 146a, and the image search system 102a. A digital content database 148a (e.g., that comprises a non-transitory computer memory) stores one or more query images that are to be searched, and/or search results that are to be displayed, and is coupled to the data storage module 146a. A bus and/or interconnect 144a is also provided to allow for inter- and intra-device communications using, for example, communication adaptor 140a. In some embodiments, the device 100a includes a display screen 142a (referred to simply as display 142a), although in some other embodiments the display 142a can be external to and communicatively coupled to the device 100a. Note that in an example, components like the operating system 136a and the image search system 102a can be software modules that are stored in memory 134a and executable by the processor 132a. In an example, at least sections of the image search system 102a can be implemented at least in part by hardware, such as by Application-Specific Integrated Circuit (ASIC) or microcontroller with one or more embedded routines. The bus and/or interconnect 144a is symbolic of all standard and proprietary technologies that allow interaction of the various functional components shown within the device 100a, whether that interaction actually take place over a physical bus structure or via software calls, request/response constructs, or any other such inter and intra component interface technologies, as will be appreciated.

Processor 132a can be implemented using any suitable processor, and may include one or more coprocessors or controllers, such as an audio processor or a graphics processing unit, to assist in processing operations of the device 100a. Likewise, memory 134a can be implemented using any suitable type of digital storage, such as one or more of a disk drive, solid state drive, a universal serial bus (USB) drive, flash memory, random access memory (RAM), or any suitable combination of the foregoing. Operating system 136a may comprise any suitable operating system, such as Google Android, Microsoft Windows, or Apple OS X. As will be appreciated in light of this disclosure, the techniques provided herein can be implemented without regard to the particular operating system provided in conjunction with device 100a, and therefore may also be implemented using any suitable existing or subsequently-developed platform.

Communication adaptor 140a can be implemented using any appropriate network chip or chipset which allows for wired or wireless connection to a network and/or other computing devices and/or resources. The device 100a also includes one or more I/O components 138a, such as one or more of a tactile keyboard, the display 142a, a mouse, a touch sensitive or a touch-screen display (e.g., the display 142a), a trackpad, a microphone, a camera, scanner, and location services. In general, other standard componentry and functionality not reflected in the schematic block diagram of FIG. 1 will be readily apparent, and it will be further appreciated that the present disclosure is not intended to be limited to any specific hardware configuration. Thus, other configurations and subcomponents can be used in other embodiments.

Also illustrated in FIG. 1 is the image search system 102a implemented on the device 100a. In an example embodiment, the system 102a includes a query input module 104 and a search result display module 106, each of which will be discussed in detail in turn. In an example, the components of the system 102a are in communication with one another or other components of the device 100a using the bus and/or interconnect 144a, as will be discussed in further detail in turn. The components of the system 102a can be in communication with one or more other devices including other computing devices of a user, server devices 100b, cloud storage devices, licensing servers, or other devices/systems. Although the components of the system 102a are shown separately in FIG. 1, any of the subcomponents may be combined into fewer components, such as into a single component, or divided into more components as may serve a particular implementation.

In an example, the components of the system 102a performing the functions discussed herein with respect to the system 102a may be implemented as part of a stand-alone application, as a module of an application, as a plug-in for applications, as a library function or functions that may be called by other applications, and/or as a cloud-computing model. Thus, the components of the system 102a may be implemented as part of a stand-alone application on a personal computing device or a mobile device. Alternatively, or additionally, the components of the image system 102a may be implemented in any application that allows initiation of an image search query and causing display of the search results.

In an example, the communication adaptor 140a of the device 100a can be implemented using any appropriate network chip or chipset allowing for wired or wireless connection to network 105 and/or other computing devices and/or resources. To this end, the device 100a is coupled to the network 105 via the adaptor 140a to allow for communications with other computing devices and resources, such as the server 100b. The network 105 is any suitable network over which the computing devices communicate. For example, network 105 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

In one embodiment, the server 100b comprises one or more enterprise class devices configured to provide a range of services invoked to provide an image search process, as variously described herein. In some embodiments, the server 100b comprises an image search system 102b providing such services, as variously described herein. Although one server implementation of the image search system is illustrated in FIG. 1, it will be appreciated that, in general, tens, hundreds, thousands, or more such servers can be used to manage an even larger number of image search functions.

In the illustrated embodiment, the server 100b includes one or more software modules configured to implement certain of the functionalities disclosed herein, as well as hardware configured to enable such implementation. These hardware and software components may include, among other things, a processor 132b, memory 134b, an operating system 136b, the image search system 102b (also referred to as system 102b), data storage module 146b, and a communication adaptor 140b. A digital content database 148b (e.g., that comprises a non-transitory computer memory) comprises a plurality of candidate images that are to be searched, and/or one or more query image, and is coupled to the data storage module 146b. A bus and/or interconnect 144b is also provided to allow for inter- and intra-device communications using, for example, communication adaptor 140b and/or network 105. Note that components like the operating system 136b and image search system 102b can be software modules that are stored in memory 134b and executable by the processor 132b. The previous relevant discussion with respect to the symbolic nature of bus and/or interconnect 144a is equally applicable here to bus and/or interconnect 144b, as will be appreciated.

Processor 132b is implemented using any suitable processor, and may include one or more coprocessors or controllers, such as an audio processor or a graphics processing unit, to assist in processing operations of the server 100b. Likewise, memory 134b can be implemented using any suitable type of digital storage, such as one or more of a disk drive, a universal serial bus (USB) drive, flash memory, random access memory (RAM), or any suitable combination of the foregoing. Operating system 136b may comprise any suitable operating system, and the particular operating system used is not particularly relevant, as previously noted. Communication adaptor 140b can be implemented using any appropriate network chip or chipset which allows for wired or wireless connection to network 105 and/or other computing devices and/or resources. The server 100b is coupled to the network 105 to allow for communications with other computing devices and resources, such as the device 100a. In general, other componentry and functionality not reflected in the schematic block diagram of FIG. 1 will be readily apparent in light of this disclosure, and it will be further appreciated that the present disclosure is not intended to be limited to any specific hardware configuration. In short, any suitable hardware configurations can be used.

The server 100b can generate, store, receive, and transmit any type of data, including digital contents and/or codes associated with such digital contents. As shown, the server 100b includes the image search system 102b that communicates with the system 102a on the client device 100a. In an example, the image searching features can be implemented exclusively by the image search system 102a (e.g., in which case the components of the system 102b will be present in the system 102a), exclusively by the image search system 102b, and/or may be shared between the image search systems 102a and 102b.

For example, when located in the server 100b, the image search system 102b comprises an application running on the server 100b or a portion of a software application that can be downloaded to the device 100a. For instance, the system 102a can include a web hosting application allowing the device 100a to interact with content from the image search system 102*b* hosted on the server 100*b*. In this manner, the server 100*b* reduces searches for digital images. Thus, the location of some functional modules in the system 102*b* may vary from one embodiment to the next. For instance, while the encoder 404 is shown on the server side in this example case, the encoder can be duplicated on the client side as well (e.g., within the system 102*a*) in other embodiments. Any number of client-server configurations will be apparent in light of this disclosure. In still other embodiments, the techniques may be implemented entirely on a user computer, e.g., simply as stand-alone image search application. Similarly, while the digital content database 148*a* is shown on the client side in this example case, it may be on the server side in other embodiments, such as a cloud-based image database. Thus, the database of the digital content can be local or remote to the device 100*a*, so long as it is accessible by the modules implemented by the system 102*a* or implemented by the system 102*b*.

Example Operation

Figure 2A:
FIG. 2A illustrates an example user interface and search query for an image search system.
Figure 2B:
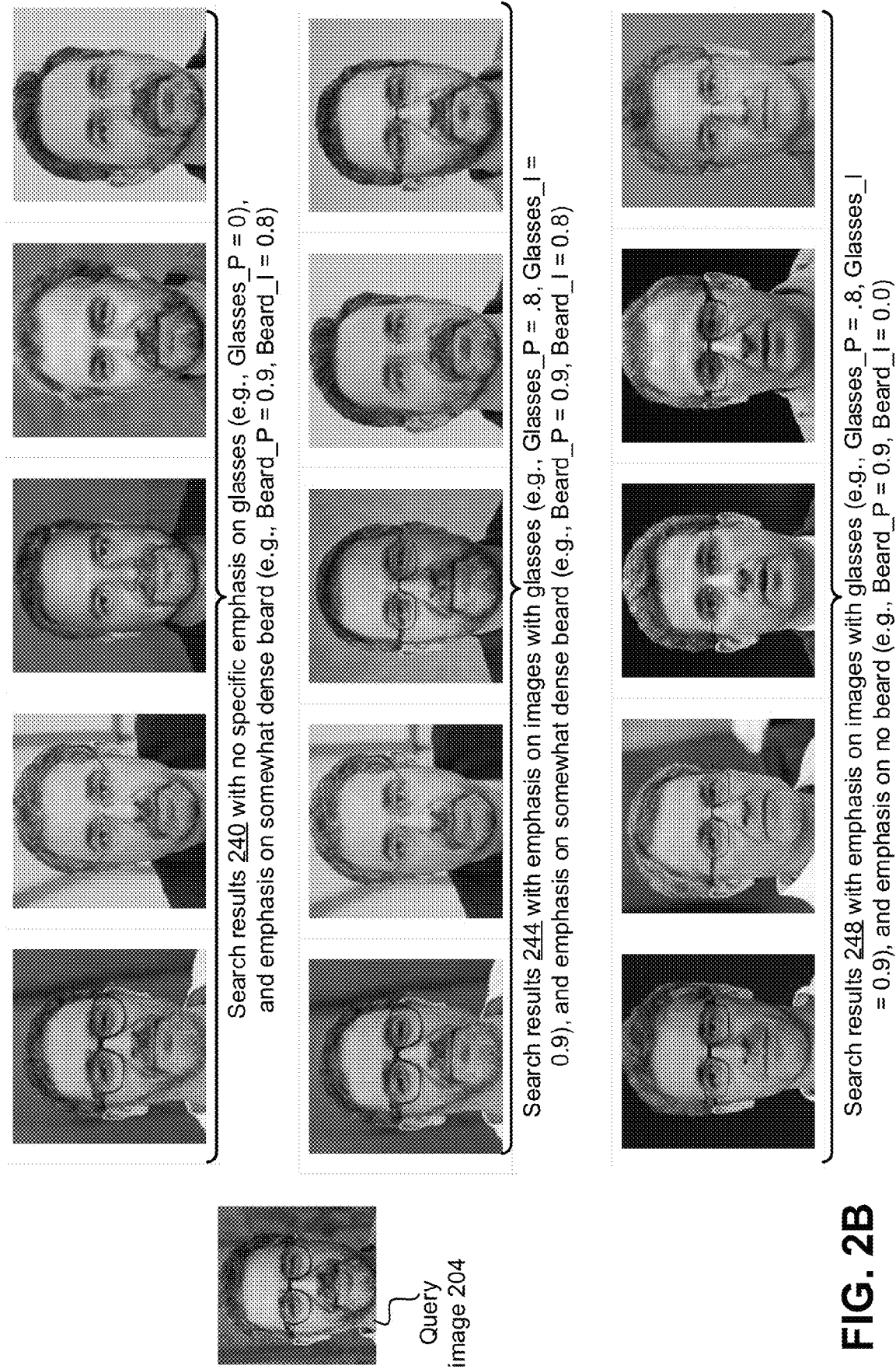
FIG. 2B illustrates example search results generated by the system based on corresponding search queries, in accordance with some embodiments of the present disclosure.

FIG. 2A illustrates an example user interface and search query 200 for an image search system such as 102*a-b*, and FIG. 2B illustrates example search results 240, 244, 248 generated by that system based on corresponding search queries, in accordance with some embodiments of the present disclosure. For example, the example search query 200 is received by the query input module 104 of the system 102*a* of the device 100*a* of FIG. 1. The search query 200 comprises at least one query image, such as the query image 204. In the example use case of FIG. 2A, the search is for facial images, and the query image 204 is that of a human face.

The principles of this disclosure can be used to search any type of query images, such as the query image 204 including a human face, or other types of query images, such as query images comprising flowers, mountains, and so on. For purposes of this disclosure, the query image is assumed to include a human face (or human body including a face, along with optional background objects). However, such assumption is not meant to limit the scope of this disclosure, and principles of this disclosure can be applied to any other appropriate type of query image as well, as will be appreciated.

In some embodiments, the search query is input by a user, where the user wants to find search results that are similar to the query image 204. In some embodiments, the user can also specify one or more attributes that are to be emphasized, ignored, or penalized during the search process, and can also change the values or characteristics of one or more attributes that are to be searched. Attributes are features within the query image that is to be searched, and/or desired features within the images of the search results. For example, assume a use case where an attribute is facial "beard". The user can specify preferences associated with beard in the search results, e.g., whether the search results should or should not include beard. As will be discussed in further detail, the preference associated with an attribute need not be a binary preference (e.g., either beard or not beard), and rather represent a continuum of choices associated with the beard.

The attributes are based on the image to be searched. For example, when the query image 204 is of a human face, the corresponding attributes can be features of the human face, such as whether the person wears glasses, has beard, hair color of the person, skin tone or color of the person, whether the person is smiling, a mood of the person (e.g., whether the person appears to be happy or sad), a gender of the person, and so on.

If a type of the query image changes, the attributes change accordingly. For example, if the query image includes a mountain, the attributes can indicate whether the mountain has snow, whether the mountain has trees, where the sky in the background has cloud, whether it is raining or snowing on the mountain, and so on.

In some embodiments, the user initiating the search can provide further details about various attributes that the user desires in the search results. For example, in the example use case of FIG. 2A, the user selects two example attributes: glasses and beard. The user can choose more attributes, e.g., through the interactive user interface (UI) 210 of FIG. 2A.

As illustrated in FIG. 2A, for each attribute, the user can select a corresponding preference value and a corresponding intensity value. In some embodiments, the preference value associated with an attribute is indicative of a level of emphasis to be placed on the attribute during a search process, and the intensity value associated with the attribute is indicative of a characterization of the attribute that is to be searched.

For example, in FIG. 2A, the attribute "beard" has a corresponding preference value and a corresponding intensity value. The preference value indicates how important the attribute "beard" is in the search process. The preference value does not indicate whether it is desirable that the search results includes beard or does not include beard—rather, the preference value indicates a degree of emphasis or importance to be placed on the "beard" attribute during the search process.

The intensity value, on the other hand, characterizes the "beard" attribute. For example, the intensity value indicates whether it is desirable that the images in the search results include, for example, a lot of beard, some beard, or no beard at all (e.g., clean shaven face).

It may be noted that the preference value and the intensity value for a specific attribute are mutually independent, e.g., can be independently adjusted. In the example use case of FIG. 2A, the user uses a slidable knob on a bar, to adjust each of the preference value and the intensity value. In other examples, the user can input the preference value and/or the intensity value by another appropriate manner, such as by typing in a specific value, selecting a specific value via a rotating dial, providing a verbal input or a gesture indicating a specific value, and/or so on. Any number of user interface control features can be provisioned to allow the user to convey specific preference and/or the intensity values, and the present disclosure is not intended to be limited to any particular ones.

FIG. 2B illustrates example search results for various example preference values and intensity values in the search query, in accordance with some embodiments of the present disclosure. For example, FIG. 2B illustrates the query image 204 that is input via the search query 200 of FIG. 2A. FIG. 2B also illustrates three sets of search results 240, 244, and 248, generated for different combinations of preference and intensity values.

Search results 240 in FIG. 2B include a plurality of images that are generated with no specific emphasis on the attribute "glasses", e.g., preference value of the attribute "glasses" (glass P) is set to zero. As the preference value of attribute "glasses" is set of zero, irrespective of the associated intensity value, the search results will provide no specific emphasis on "glasses". Accordingly, the search results 240 include two images with glasses, and three without glasses.

Search results 240 are also generated with more emphases on the attribute "beard." For example, preference value of the attribute "beard" (beard_P) is set to 0.9. Thus, the attribute "beard" is emphasized during the search. Furthermore, the intensity value of the attribute "beard" is set to 0.8. The intensity value of 0.8 corresponds to, for example, somewhat dense beard, and accordingly, the images of the search results 240 include somewhat dense beard. If, for example, the intensity value was set to 1.0, the search algorithm would have searched for faces with even denser beard, or faces with longer beard.

FIG. 2B also includes search results 244. Search results 244 in FIG. 2B include a plurality of images that are generated with more emphasis on the attribute "glasses", e.g., preference value of the attribute "glasses" (glass P) set to 0.9. Also, the corresponding intensity value is set to 0.8. Thus, for example, the search results 244 only include images with glasses.

The preference and intensity values for the attribute "beard" in the search results 244 are similar to those in the search results 240. Hence, there is no noticeable change in the "beard" attribute among the search results 240 and 244.

FIG. 2B also includes search results 248. The preference and intensity values for the attribute "glasses" in the search results 248 are similar to those in the search results 244. Hence, there is no noticeable change in the "glasses" attribute among the search results 244 and 248.

However, in the search results 248, the preference value of the attribute "beard" (beard_P) is set to 0.9, and the corresponding intensity value is set to 0.0. Thus, more emphasis is placed on this attribute, and the images are searched with no beard (e.g., corresponding to the intensity value of 0.0). Accordingly, the search results 248 have faces that are clean shaven and have no beard.

Thus, as seen in the search results 240, 244, and 248, various attributes can be independently queried in the search query. Changing preference and/or intensity values of one attribute (such as glasses) do not affect another attribute (such as beard). This is possible because attribute directions assigned to individual attributes are orthogonal, as will be discussed in further detail herein in turn.

Furthermore, in the search process executed by the system 102b, it is possible to specify a degree of emphasis to be placed on a search attribute (e.g., as specified by the preference value), as well as specify a characteristics of the search attribute (e.g., as specified by the intensity value). Note in the above examples that the intensity value can be used to specify a number of qualities. For instance, with respect to beards, the above examples refer to the size of the beard, but other beard attributes may be used as well, such as the color of the beard (e.g., black, brown, salt and pepper) and/or the style of the beard (e.g., full beard or goatee). Likewise, the intensity of glasses can be used to reflect, for instance, the color of the glasses, or the frame type (e.g., rimmed or rimless). Numerous intensity values will be appreciated, given a particular attribute of interest.

Figure 3A:
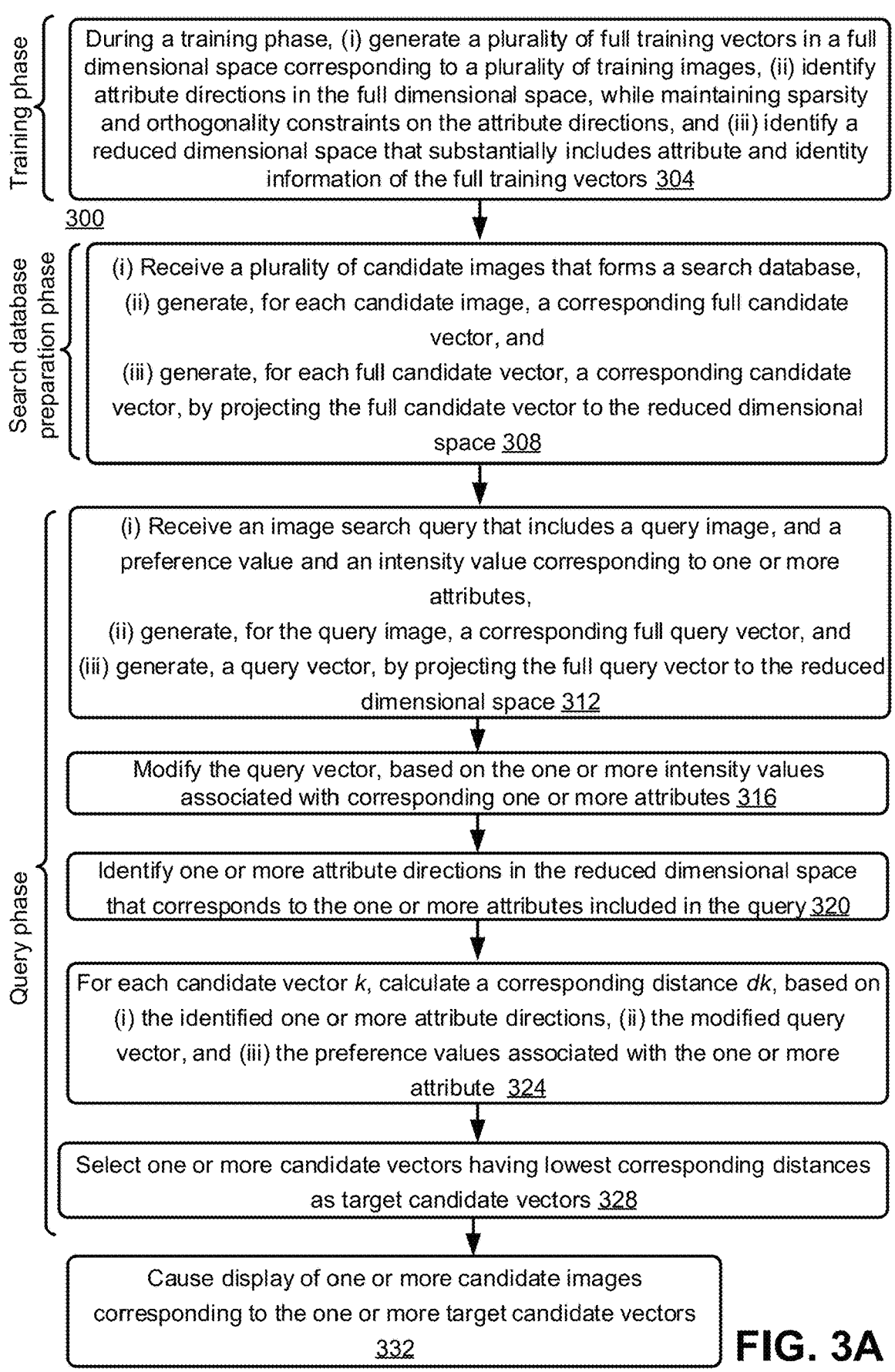
FIGS. 3A and 3B are flowcharts collectively illustrating an example methodology for an enhanced image search process, in which an image database is searched to find images that are at least in part similar to a query image, wherein various attributes or features within the images to be searched can be independently controlled, in accordance with some embodiments of the present disclosure.

FIG. 3A is a flowchart illustrating an example methodology 300 for an enhanced image search process, in which an image database is searched to find images that are at least in part similar to a query image, wherein various attributes or features within the images to be searched can be independently controlled, in accordance with some embodiments of the present disclosure. Method 300 can be implemented, for example, using the system architecture illustrated in FIG. 1, and described herein. However other system architectures can be used in other embodiments, as apparent in light of this disclosure. To this end, the correlation of the various functions shown in FIG. 3A to the specific components and functions illustrated in FIG. 1 is not intended to imply any structural and/or use limitations. Rather, other embodiments may include, for example, varying degrees of integration wherein multiple functionalities are effectively performed by one system. In another example, multiple functionalities may be effectively performed by more than one system. Although various operations of the method 300 are discussed herein as being performed by the system 102b of FIG. 1, one or more of these operations can also be performed by the system 102a as well.

The method 300 is roughly divided in three main phases—a training phase comprising block 304 of the method 300, a search database preparation phase comprising block 308 of the method 300, and a query phase comprising blocks 312-332 of the method 300. As the names suggest and as will be discussed herein in further detail in turn, the training phase is used to train the system 102b for the search process. The search database preparation phase is used to populate the search database with candidate images and their corresponding candidate image vectors. Finally, during the query phase, a user queries the systems 102a, 102b with a query image, and the systems 102a, 102b output and display appropriate search results based on the query.

Figure 3B:
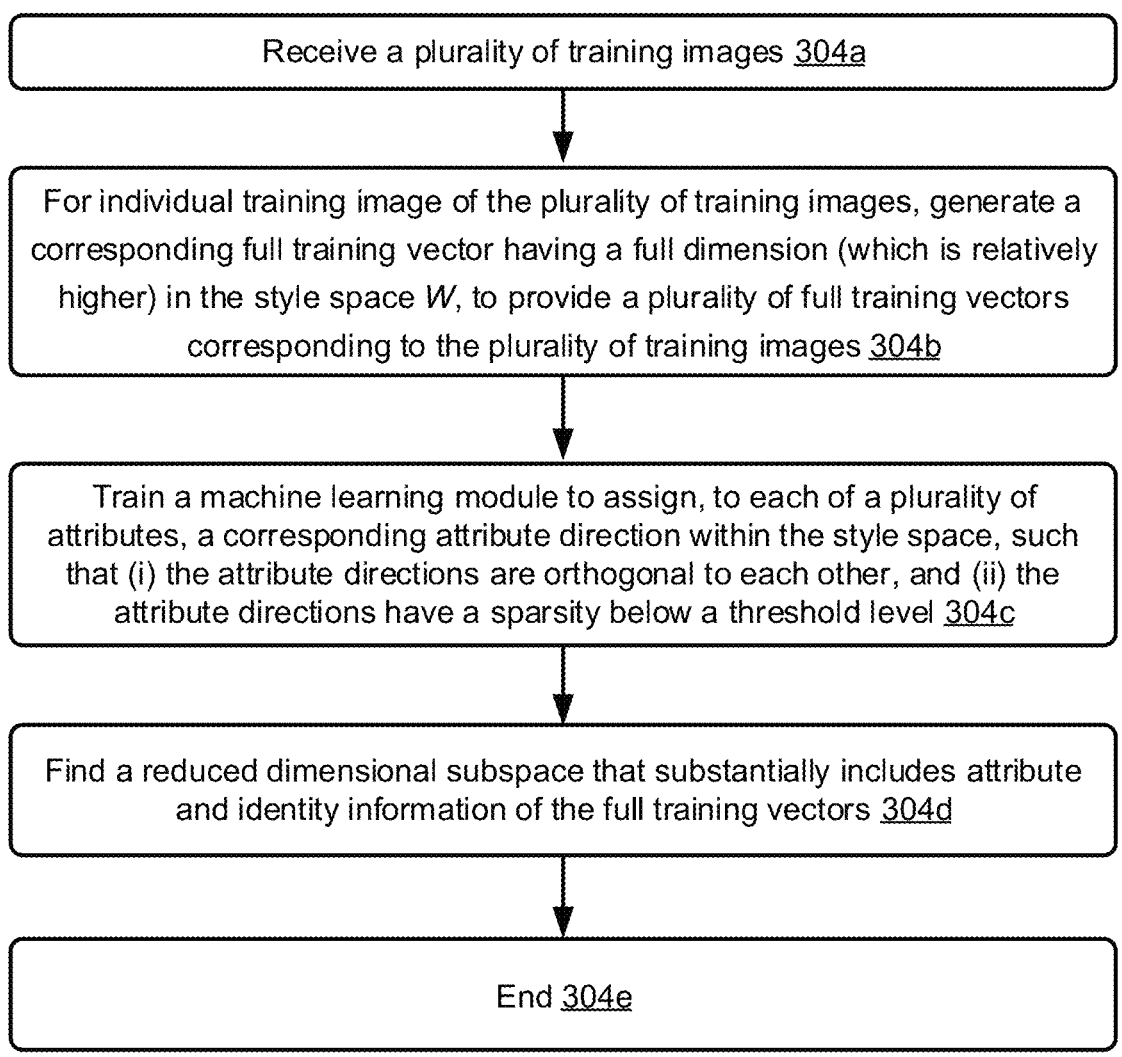

The method 300 comprises, at 304, during the training phase, (i) generating a plurality of full training vectors in a full dimensional space corresponding to a plurality of training images, (ii) identifying attribute directions in the full dimensional space, while maintaining sparsity and orthogonality constraints on the attribute directions, and (iii) identifying a reduced dimensional space that substantially includes attribute and identity information of the full training vectors. The operations at block 304 are conducted by a training module 108 of the system 102b of FIG. 1. FIG. 3B is a flowchart illustrating an example methodology for implementing the operations of the block 304 of the method 300 of FIG. 3A, in accordance with some embodiments of the present disclosure. Thus, the method 304 of FIG. 3B depicts the training phase in block 304 of the method 300.

Figure 4A:
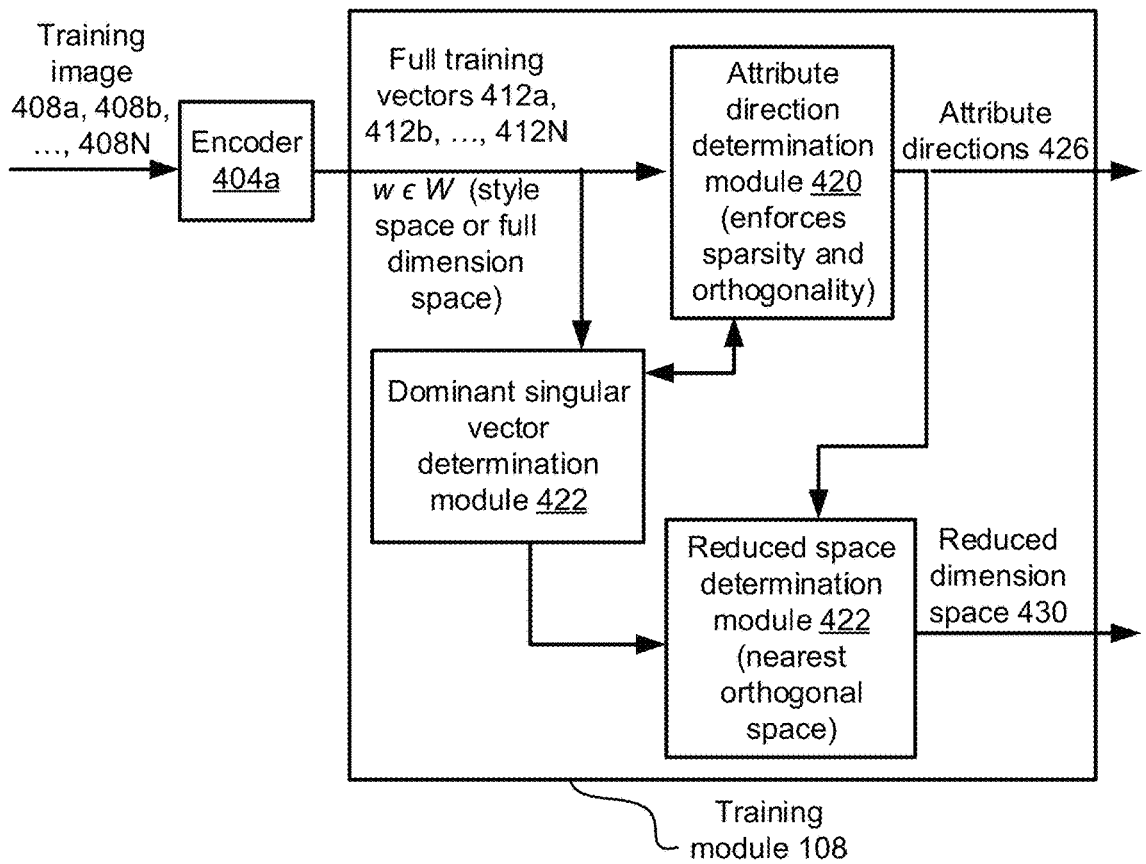
FIG. 4A illustrates an example implementation of a training module that is usable to train an image search system of a server of FIG. 1, in accordance with some embodiments of the present disclosure.

The method 304 of FIG. 3B will be discussed in unison with FIGS. 4A and 4D. FIG. 4A illustrates an example implementation of the training module 108 that is usable to train the image search system 102b of the server 100b of FIG. 1, in accordance with some embodiments of the present disclosure. FIG. 4D illustrates an example implementation of the image search system 102b of FIG. 1, in accordance with some embodiments of the present disclosure. As illustrated, the training module 108 of FIG. 4A is included within the image search system 102b of FIGS. 1 and 4D. Various operations of the method 304 will be discussed with respect to the training module 108 of FIG. 4A. For example, in an example, one or more components the training module 108 of FIG. 4A executes one or more operations discussed with respect to the method 304.

Referring to FIG. 3B, at 304a of the method 304, the training module 108 receives a plurality of training images. For example, FIG. 4A illustrates an encoder 404a receiving a plurality of training images 408a, 408b, . . . , 408N, where N is a positive integer greater than 1. N can be any appropriate number. Merely as an example, thousands of training images can be used in the method 304. The training images 408a, . . . , 408N (generally referred to as training images 408 in plural, and training image 408 in singular) can comprise real images, or synthetically generated images (such as generated by a StyleGan network discussed herein later).

The training images 408 are based on the type of image search to be conducted by the system 102b. For example, if the system 102b is to be trained for facial search (e.g., searching faces of a person), the training images can include faces of human, as illustrated in FIGS. 2A, 2B. In another example, if the system 102b is to be trained for searching images of flowers, the training images will include flowers.

Referring again to FIG. 3B, the method 304 proceeds from 304a to 304b, where for each training image of the plurality of training images, a corresponding full training vector having a full dimension is generated in a full dimensional style space W, such that a plurality of full training vectors is generated corresponding to the plurality of training images. For example, FIG. 4A illustrates generation of full training vectors 412a, 412b, . . . , 412N corresponding to the training images 408a, 408b, . . . , 408N, respectively, by the encoder 404a. The word "full" used with respect to the training vector and the dimension is used to contrast these from a "reduced" training vector and "reduced" dimension discussed herein later.

In some examples, a full training vector 412 is a vector-form representation of a corresponding image 408. Thus, a training image 408 has a corresponding unique full training vector 412, and the training image 408 can be fully and uniquely reconstructed from the full training vector.

Figure 4B:
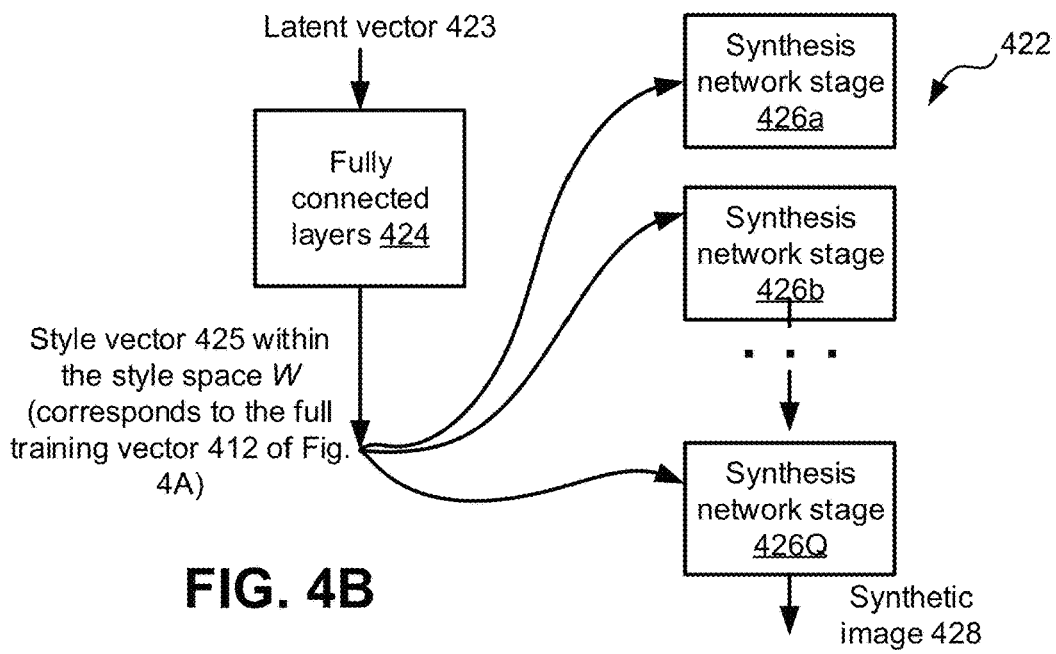
FIG. 4B illustrates an example implementation of a Style Generative Adversarial Network (StyleGAN) that is usable to transform a full vector to a corresponding image.
Figure 4D:
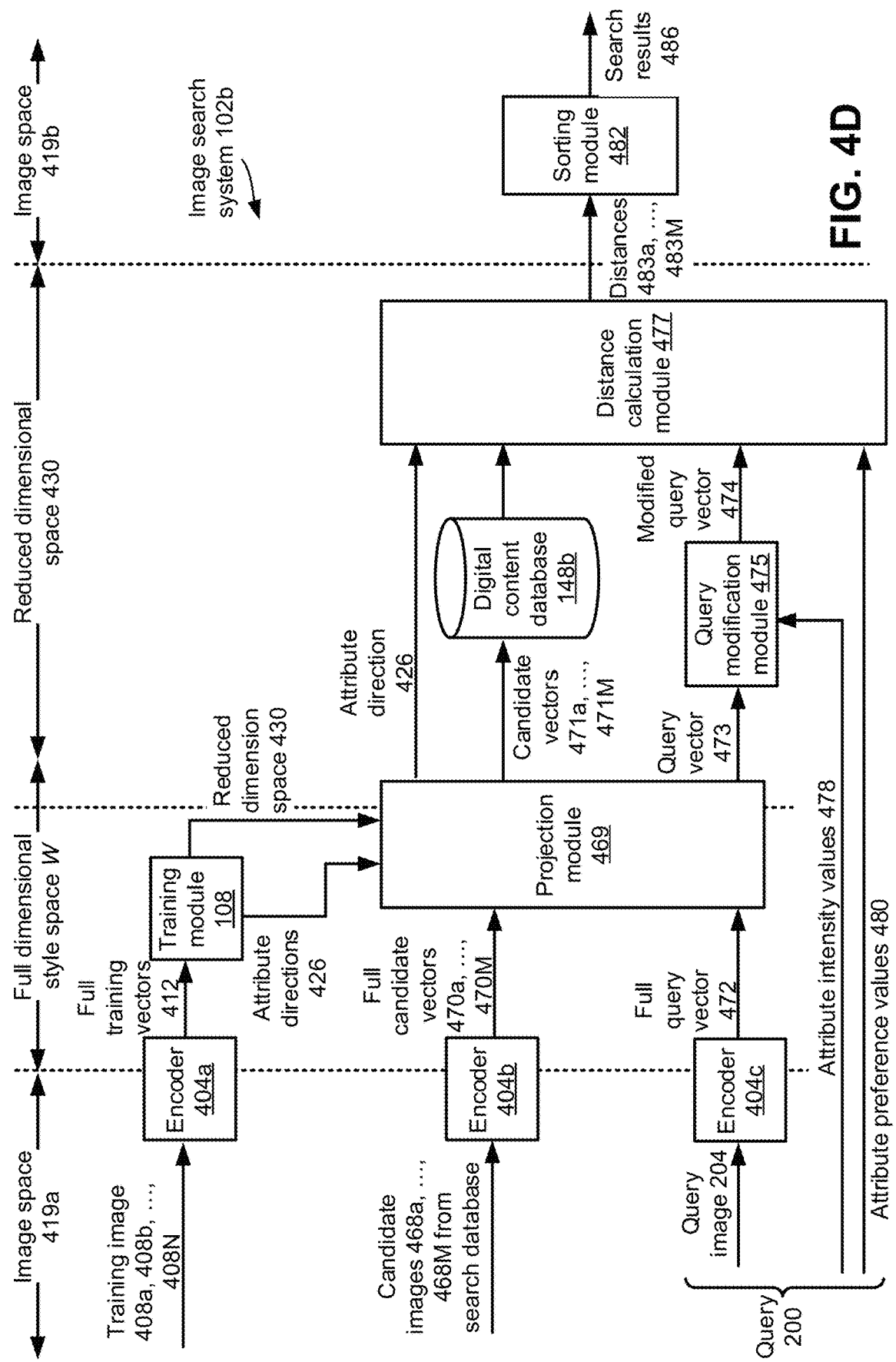
FIG. 4D illustrates an example implementation of an image search system of the server of FIG. 1, in accordance with some embodiments of the present disclosure.

For example, FIG. 4B illustrates a Style Generative Adversarial Network (StyleGAN) 422 that is usable to transform a full vector to a corresponding image. StyleGAN is a novel generative adversarial network (GAN) introduced by Nvidia® researchers in December 2018, who made the source publicly available in February 2019. The StyleGAN of FIG. 4B is an extension to the Generative Adversarial Network (GAN) architecture that proposes large changes to a generator model, including the use of a mapping network to map points in latent space to an intermediate latent space, and the use of the intermediate latent space to control style at each point in the generator model. The resulting model is capable not only of generating impressively photorealistic high-quality photos of faces, but also offers control over the style of the generated image at different levels of detail through varying the style vectors and noise.

For example, the StyleGAN 422 receives a latent vector 423, which can be randomly (or pseudo-randomly) generated or user provided. A plurality of fully connected layers 424 processes the latent vector 423, to generate a style vector 425 within the style space W. The StyleGAN 422 comprises a plurality of synthesis network stages 426a, . . . , 426Q, where Q is a positive non-zero integer. Merely as an example, there are 18 synthesis network stages 426. Each synthesis network stage 426 receives a corresponding section of the style vector 425. The last synthesis network stage 426Q outputs a synthetic image 428. Thus, the synthetic image 428 is generated based on the latent vector 423. In some implementations, noise can be added to the various synthesis network stages 426, e.g., to bring random variations in the synthetic image 428.

In some embodiments, the encoder 404a of FIG. 4A generates a full training vector 412, which corresponds to the style vector 425 of FIG. 4B. For example, a full training vector 412a can be used as a style vector 425 in FIG. 4B, to generate a corresponding synthetic image 428, where the synthetic image 428 will be similar to the training image 408a used to generate the full training vector 412a.

Thus, put differently, the StyleGAN 422 generates an image 428 using the style vector 425, whereas the encoder 404a acts in the exact opposite manner. For example, the encoder 404a generates a full training vector 412 (e.g., which is similar to the style vector 425) using the training image 408. Thus, in one example, the encoder 404 can be implemented using an inverse function of the synthesis network stages 426 of the StyleGAN 422. In another example, the encoder 404 can be implemented in any appropriate manner, as long as the encoder 404 encodes an image to generate a vector, where the vector is representative of various attributes of the corresponding image.

In an example, the encoder 404a embeds the training images 408 into a style space W, where each full training vector w ∈ W. The style space is a high or "full" dimensional space. Merely as an example where the full training vector corresponds to a style vector of a StyleGAN network having 18 stages, the style space W can be 512×18, or 9216 dimensional. Thus, each training vector 412 is 9216 dimensional in some examples. The style space W preserves information associated with various attributes of the images, such as identity, age, gender, glasses, beard, and so on. For example, the 9216-dimensional style space W includes information about a much smaller number of attributes. The number of attributes Nf can be, for example, 10, 20, 30, 40 or another appropriate number. The number of attributes Nf is much less, e.g., 1% or less than a dimension of the style space W.

Referring again to FIG. 3B, the method 304 then proceeds from 304b to 304c, where an attribute direction determination module 420 (illustrated in FIG. 4A) is trained to assign, to each of a plurality of attributes, a corresponding attribute direction within the style space W, such that (i) the attribute directions are orthogonal to each other, and (ii) the attribute directions have a sparsity below a threshold level. FIG. 4C1 illustrates an overly simplified version of the style space W and two example attribute directions, in accordance with some embodiments of the present disclosure. For example, in the example of FIG. 4C1, the style space W is assumed to be three dimensional, whereas the style space W usually is a much higher dimensional space (e.g., in one implementation, the style space W has 9216 dimensions). FIG. 4C1 is merely to explain the attribute directions, without limiting the scope of this disclosure.

For example, in the simplified example of the 3-dimensional style space W defined by corresponding X, Y, and Z axes, the cross marks illustrate various full training vectors 412a, 412b, 412c, 412d within the style space W. Also illustrated are example attribute direction 413a corresponding to an attribute "age" and another example attribute direction 413b corresponding to an attribute "smile."

For example, as one moves along the attribute direction 413a, the attribute "age" of the face in the corresponding training images increase, and vice versa. For example, in FIG. 4C1, the full training vector 412c is towards the attribute direction 413a relative to the full training vector 412a. Accordingly, a face in the image 408c corresponding to the full training vector 412c has higher age than that in the image 408a corresponding to the full training vector 412a.

In another example, similarly, as one moves along the attribute direction 413b, the attribute "smile" in the face in the corresponding training images increase, and vice versa. For example, in FIG. 4C1, the full training vector 412b is towards the attribute direction 413b relative to the full training vector 412a. Accordingly, a face in the image 408b corresponding to the full training vector 412b is smiling more than that in the image 408a corresponding to the full training vector 412a.

As discussed, FIG. 4C1 illustrates merely a three-dimensional style space W and two attribute directions 413a, 413b. However, in some implementations, the style space W is likely to have much higher dimensions, such as 18×512 (e.g., 9216 dimensions), where the number "18" corresponds to a number of synthesis network stages in the StyleGAN, and 512 corresponds to a number of layers in each such stage. In some examples, it is difficult to search for images in the 9216-dimensional style space W. Accordingly, the training phase corresponding to the method 304 arms to reduce the dimensionality of the style space W, without sacrificing substantial information about the attributes and the identity of the image, as will be discussed herein in turn.

As discussed, at 304c of the method 304 of FIG. 3B, an attribute direction determination module 420 is trained to assign, to each of a plurality of attributes, a corresponding attribute direction within the style space W, such that (i) the attribute directions are orthogonal to each other, and (ii) the attribute directions have a sparsity below a threshold level. For example, the attribute directions 413a, 413b are orthogonal to each other (e.g., angle 215 is 90 degrees). This ensures that the attributes age and smile (corresponding to the directions 413a, 413b, respectively) are independent of each other. That is, traversing along the direction 413a varies only the age, and not the smile attribute. Similarly, traversing along the direction 413b varies only the smile, and not the age attribute. Having orthogonal attribute directions disentangles the attributes, meaning that changing one attribute in the search query (such as the age) does not affect other attributes (such as the smile). Put differently, due to the orthogonality, a characteristic of a first attribute changes along a corresponding first attribute direction, but a characteristic of a second attribute (or any other attributes) does not change along the first attribute direction. That is, when traversing along an attribute direction, characteristics of one, and only one, attribute change.

Put differently, the orthogonality constraint among the attributes facilitates decomposition of the distance between any pair of images (e.g., based on the distance between two corresponding full training vectors) onto their attribute directions independently. Furthermore, the orthogonality facilitates decomposition using a simple matrix multiplication, and without requiring any matrix inversion. This reduces the computational cost of the decomposition. The orthogonality constraint can be enforced either globally or layer-wise. In the StyleGAN architecture, for example, there are 512-dimensional style vectors (e.g., full vectors) for each of the 18 synthesis network stages 426, making the size of the StyleGAN latent space 18×512, or 9216. Thus, orthogonality can be imposed globally on the vectors of size 9216, or can be imposed on the 512-dimensional vectors inside each of the 18 corresponding layers. Layer-wise orthogonality is a stricter version of the global orthogonality. Thus, if orthogonality is ensured inside all the layers, the vectors will be orthogonal globally (although global orthogonal may not necessarily imply layer wise orthogonality). In some example, in relatively high dimensional spaces, any random pairs of vectors are almost orthogonal. Thus, enforcing orthogonality on high dimensional space may not be strict enough. So, in some examples, enforcing orthogonality on a lower dimensional space is preferred. Thus, in some examples, orthogonality is imposed on the 512-dimensional vectors inside each of the 18 corresponding layers, which also ensures orthogonality globally on the 9216-dimensional style space W.

For example, to enforce orthogonality, the attribute direction determination module 420 of the training module 108 of FIG. 4A is trained to detect attribute directions in the style space W. For example, the style space W, as discussed, is 9216-dimensional, whereas there may be a much lower number of attributes, such as 20, 30, 40, or another appropriate number of attributes. The attribute direction determination module 420 analyses the full training vectors 412a, . . . , 412N, to determine a direction in which a specific attribute varies, and assigns the direction to the corresponding attribute. Thus, for a plurality of attributes (e.g., some of which have been discussed with respect to FIG. 2A) are assigned a corresponding plurality of attribute directions.

In some embodiments, the attribute direction determination module 420 is a machine learning module (e.g., is a neural network), and this module is trained to determine the attribute directions. For example, the faces included in the training images 408 are pre-tagged or annotated based on the age. The attribute direction determination module 420 analyses the corresponding full training vectors 412, to find a direction in which the age increases in the full training vectors 412, thereby determining an attribute direction corresponding to the age attribute. Put differently, after annotating the training images, the direction corresponding to each attribute is obtained by linearly classifying the attribute in the style space W. The attribute direction determination module 420 similarly finds other attribute directions for other attributes. As will be discussed, to minimize the correlation among the attributes and to easily decompose the distance among the attributes, orthogonality and sparsity conditions are enforced on the attribute directions.

The attribute directions, as determined by the attribute direction determination module 420, can be orthogonal to each other. If the attribute directions are not fully orthogonal, after determining the attribute directions, attribute direction determination module 420 replaces the attribute directions with their closest set of orthogonal vectors.

The problem of finding the nearest orthogonal set to a given set of vectors is known as the orthogonal Procrustes problem in linear algebra and has been shown to have an answer in closed form. For example, solving this problem does not require solving another iterative optimization problem, which makes it computationally efficient. Thus, once the attribute directions are replaced with their closest set of orthogonal vectors, the new attribute directions are orthogonal to each other. For example, if the original angle 215 between the example attribute directions 413a, 413b is not exactly 90 degrees, the attribute directions 413a, 413b are replaced by their closest set of orthogonal vectors, such that the new attribute directions assigned to the attributes age and smile are orthogonal.

As also discussed with respect to the block 304c of the method 304, the attribute directions have a sparsity below a threshold level. For example, to enforce sparsity, the attribute direction determination module 420 tries to find the attribute directions that have only a few nonzero entries. In other words, the sparsity ensures that the system 102b is able to manipulate the attributes linearly (e.g., by changing attribute characteristics via traversing in the attribute direction), by only changing a few of the entries in a full training vector w. The sparsity enforcement can be effective in reducing correlation among attributes, as each attribute direction is only impacting a tiny subset of the entries. The sparsity constraint, in some examples, is implemented by augmenting a loss function with an l1 norm regularization on the attribute directions. In an example, the l1 norm of a vector f is the sum of the absolute of values of its entries, and is a convex approximation of the l0 norm. The l0 norm of the vector f is a number of non-zero entries in f. Thus, by regularizing the l1 norm of the vector f, the number of non-zero entries can be reduced or minimized. Thus, the attribute directions are selected such that the sparsity of individual attribute directions meets a threshold level (e.g., a number of non-zero entries in individual attribute directions is less than a corresponding threshold value).

As discussed, the dimension of the style space W, in which the full training vectors 412 are generated, is relatively high (such as 9216 in some examples), which can be prohibitively large for efficient storage and real-time search in some examples. So, the training module 108 arms to reduce a size of the style space W to a subspace (e.g., a most relevant subspace) that contains substantially all the necessary information, without impacting the search performance. The relevant subspace of the style space W is subspace spanned by the learned attribute directions, as they contain information on the attributes of interest. In an example, to preserve information on the identity of the facial images, additional dimensions (e.g., in addition to the learned attribute directions) of the style space W and/or an identity descriptor is used.

For example, FIG. 4C2 illustrates a 2-dimensional (2D) hyperplane 417 that is spanned by the two attribute directions 413a and 413b, in accordance with some embodiments of the present disclosure. Thus, the 2D hyperplane 417 is a relevant subspace of the 3D style space W, where the 2D space contains information on the attributes of interest. Again, as discussed earlier, FIG. 4C2 is merely a simplified example, and the dimensionality of the actual style space W and the subspace is much more than 3 and 2, respectively.

Block 304d onwards of the method 304 aims to find the most relevant subspace of the style space W. For example, referring again to FIG. 3B, the method 304 then proceeds from 304c to 304d. At 304d, the training module 108 finds a reduced dimensional subspace that substantially includes attribute and identity information of the full training vectors. For example, since each full training vector is able to reconstruct the corresponding training image, while preserving the identity and background, the style space W can be used for identity search as well. However, searching in this higher dimensional space is computationally inefficient, as its size is 18×512, e.g., more than 9000.

Assume that there are Nf number of learned attribute directions. For example, as discussed, there are attributes such as age, gender, beard, glasses, and assume there are Nf number of such attributes, and corresponding Nf number of orthogonal attribute directions determined by the attribute direction determination module 420. To find the most relevant subspace, the training module 108 undertakes a data-driven approach, and searches in the relevant subspace (referred to herein as reduced dimensional subspace) that contains most of the energy of the dataset comprising the training vectors 412.

In some embodiments, this reduced dimensional subspace spans the attributes directions, and is also spanned by first Nd singular vectors of the dataset embedded in the style space W, after ignoring the information represented by the attribute directions. The Nd singular vectors are calculated by decomposing the dataset (e.g., comprising the full training vectors 412) using Singular Value Decomposition (SVD), which can be calculated by the dominant singular vector determination module 422 of the training module 108 of FIG. 4A. Mathematically speaking, given a full training vector w and a set of orthogonal attribute directions fi, i=0, . . . , Nf, the full training vector w can be projected onto the subspace spanned by the attribute directions using a matrix multiplication Fw, where each row of the matrix F contains a corresponding attribute direction fi.

Furthermore, (I−F).w=w−F.w provides a residual vector, which is a representation of the full training vector w in the subspace not spanned by the attribute directions, where I is the identity matrix. Therefore, the most relevant residual subspace (e.g., the reduced dimensional subspace) can be determined by selecting the Nd most dominant singular vectors of the residual vectors. This generates a Nd dimensional subspace that contains most of the energy of the residual vectors, and is orthogonal to the Nf dimensional subspace spanned by the attribute directions. Thus, the size of the final reduced dimensional subspace of interest has a dimension of at least (Nf+Nd). In some examples, for most datasets, most of the energy of the residual style vectors, e.g. 99%, is concentrated in a very small subspace of the style space W. In an example where the style space W has a size of 18×512, or 9216, the Nd is selected to be 128. If there are, for example, 50 learned attributes (e.g., Nf=50), then there are (50+128), or about 178 dimensions in the reduced dimensional subspace. In some examples, the reduced dimensional subspace has about 1% or less dimensions than the full-dimensional style space W.

Thus, in some embodiments, among the (Nd+NJ) dimensions of the reduced dimensional subspace, Nf directions correspond to the corresponding Nf number of attribute directions. The remaining Nd dimensions preserve other relevant information about the image, such as identity of the person depicted in the image, background of the image, and so on. Thus, in the above discussed example, the identity of the person in the image is preserved in the Nd number of subspaces.

In some other embodiments, the identity of the person in the image is preserved using an identity descriptor, e.g., instead of (or in addition to) the Nd number of subspaces. For example, once a person or a face in an image is identified (e.g., using an appropriate face detection model), a corresponding identity descriptor is assigned to the face. Thus, the above discussed Nd dimensions in the reduced dimensional subspace is not used in some such embodiments, and the reduced dimensional subspace spans only the Nf dimensional learned attribute directions. For example, in some image databases, identity descriptors are already precalculated and indexed. In some such examples, the Nd dimensional space can be ignored, e.g., not included in the reduced dimensional subspace.

After the reduced dimensional subspace is determined, the method 304 ends at 304e. Thus, as illustrated in FIGS. 4A and 4D, the training module 108 outputs, as discussed with respect to the method 304, attribute directions 426 and information defining the reduced dimension space 430.

Referring again to the method 300 of FIG. 3A, the method 300 proceeds from 304 to 308. Block 308 and various other subsequent blocks of the method 300 are discussed with respect to the image search system 102b of FIG. 4D. The block 308 comprises the search database preparation phase, in which a search database is populated with candidate image vectors corresponding to a plurality of candidate images.

At 308, the system 102b receives a plurality of candidate images 468a, . . . , 468M that form a search database, as illustrated in FIG. 4D. The candidate images 468 can be collected from any appropriate source, e.g., from the Internet, from users submitting candidate images, and/or any other appropriate manner in which the candidate images can be collected. The candidate images 468 can be stored in the digital content database 148b of the server 100b.

Also at 308, the system 102b (such as an encoder 404b) generates, for each candidate image 468, a corresponding full candidate vector 470, to provide a plurality of full candidate vectors 470a, . . . , 470M corresponding to the plurality of candidate image 468a, . . . , 468M. The encoder 404b can be same as the encoder 404a, or can be a different encoder. The encoder 404b operates in the same manner as the encoder 404a, by transforming a candidate image from an image space 419a to the full dimensional style space W. As discussed with respect to the encoder 404a, a full candidate vector 470 is a vector representation of a corresponding candidate image 468, and retains attribute and identity information of the candidate image 468.

Illustrated in FIG. 4D is a projection module 469. Also at 308, the projection module 469 generates, for each full candidate vector 470, a corresponding candidate vector 471, by projecting the full candidate vector 470 to the reduced dimensional space 430, thereby providing a plurality of candidate vectors 471a, . . . , 471M corresponding to the plurality of candidate images 468a, . . . , 468M. For example, the projection module 469 receives information about the reduced dimension space 430 from the training module 108, as discussed with respect to FIG. 4A. As discussed, the reduced dimension space 430 has a reduced dimension (e.g., Nf+Nd) relative to the full dimensional style space W. The projection module 469 maps a full candidate vector 470 (e.g., which has the dimensions of the full dimensional style space W) to the candidate vector 471 (e.g., which has the dimensions of the reduced dimensional space 430). As discussed, substantially (e.g., 99% or higher, as discussed herein with respect to FIG. 4A) all relevant attribute and identity information of the full candidate vector 470 are preserved in the reduced dimension candidate vector 471. Because the candidate vectors 471a, . . . , 471M are in the reduced dimension space 430, the candidate vectors 471a, . . . , 471M are also referred to herein as reduced candidate vectors 471a, . . . , 471M. In some examples, the candidate vectors 471a, . . . , 471M are stored in the digital content database 148b, or another database accessible to the system 102b.

The method 308 then proceeds from 308 to 312, which commences the query phase of the method 300. At 312, the system 102b receives an image search query that includes a query image, and a preference value and an intensity value corresponding to one or more attributes. For example, FIG. 2A illustrates an example query 200 comprising a query image 204, and preference and intensity values corresponding to attributes "beard" and "glasses."

Also at 312, the system 102b (such as an encoder 404c) generates, for the query image 204, a corresponding full query vector 472. The encoder 404c can be same as the encoders 404a and/or 404b, or can be a different encoder. The encoder 404c operates in the same manner as the encoder 404a, by transforming the query image 204 to the full dimensional style space W. As discussed with respect to the encoder 404a, the full query vector 472 is a vector representation of the query image 204, and retains attribute and identity information of the query image 204.

Also at 312, the projection module 469 generates, for the full query vector 472, a corresponding query vector 473, by projecting the full query vector 472 to the reduced dimensional space 430. For example, the projection module 469 receives information about the reduced dimension space 430 from the training module 108, as discussed with respect to FIG. 4A. The reduced dimension space 430 has a reduced dimension (e.g., Nf+Nd) relative to the full dimensional style space W. The projection module 469 maps the full query vector 472 (e.g., which has the dimensions of the full dimensional style space W) to the query vector 473 (e.g., which has the dimensions of the reduced dimensional space 430). As discussed, substantially (e.g., 99% or higher, as discussed herein with respect to FIG. 4A) all relevant attribute and identity information of the full query vector 472 are preserved in the reduced dimension query vector 473. Because the query vector 473 is in the reduced dimension space 430, the query vector 473 is also referred to herein as reduced query vector 473.

The method 300 then proceeds from 312 to 316, where the query vector 473 is modified (e.g., by a query modification module 475 illustrated in FIG. 4D), based on one or more intensity values corresponding to one or more corresponding attributes, to generate a modified query vector 474. For example, consider the scenario where the user wants the search results to be happy smiling faces, but the query face is neutral (e.g., neither happy, nor sad). In such case, penalizing this neutral face attribute (which will be discussed herein later) during the search process populates the search results with both happy and sad faces (e.g., anything, but a neutral face). On the other hand, ignoring the neutral face attribute (which will also be discussed herein later) will populate the search results with neutral, sad, and happy faces. Thus, penalizing or ignoring the neutral face attribute does not necessarily populate the search results with happy faces. In some embodiments, to have happy faces in the search requests, the query vector 473 itself is modified, to reflect a happy face.

Thus, the modification operation of block 316 of the method 300 changes the query vector itself, thereby effectively changing the query image that is to be searched. For example, assume an intensity value of an attribute is set to correspond to first characteristics of the attribute (e.g., a happy face), whereas the query image 204 and the corresponding query vector 473 has second characteristics of the attribute (e.g., a neutral face) that is different from the first characteristics. In some embodiments, the modification operation by the query modification module 475 modifies the query vector 473 to generate the modified query vector 474, such that the modified query vector 474 now reflects the first characteristics of the attribute. Thus, the subsequent search operation is conducted on the modified query vector 474 having the first characteristics of the attribute (e.g., a happy face), and accordingly, the search results are likely to be populated with images having the first characteristics of the attribute.

Figure 4E:
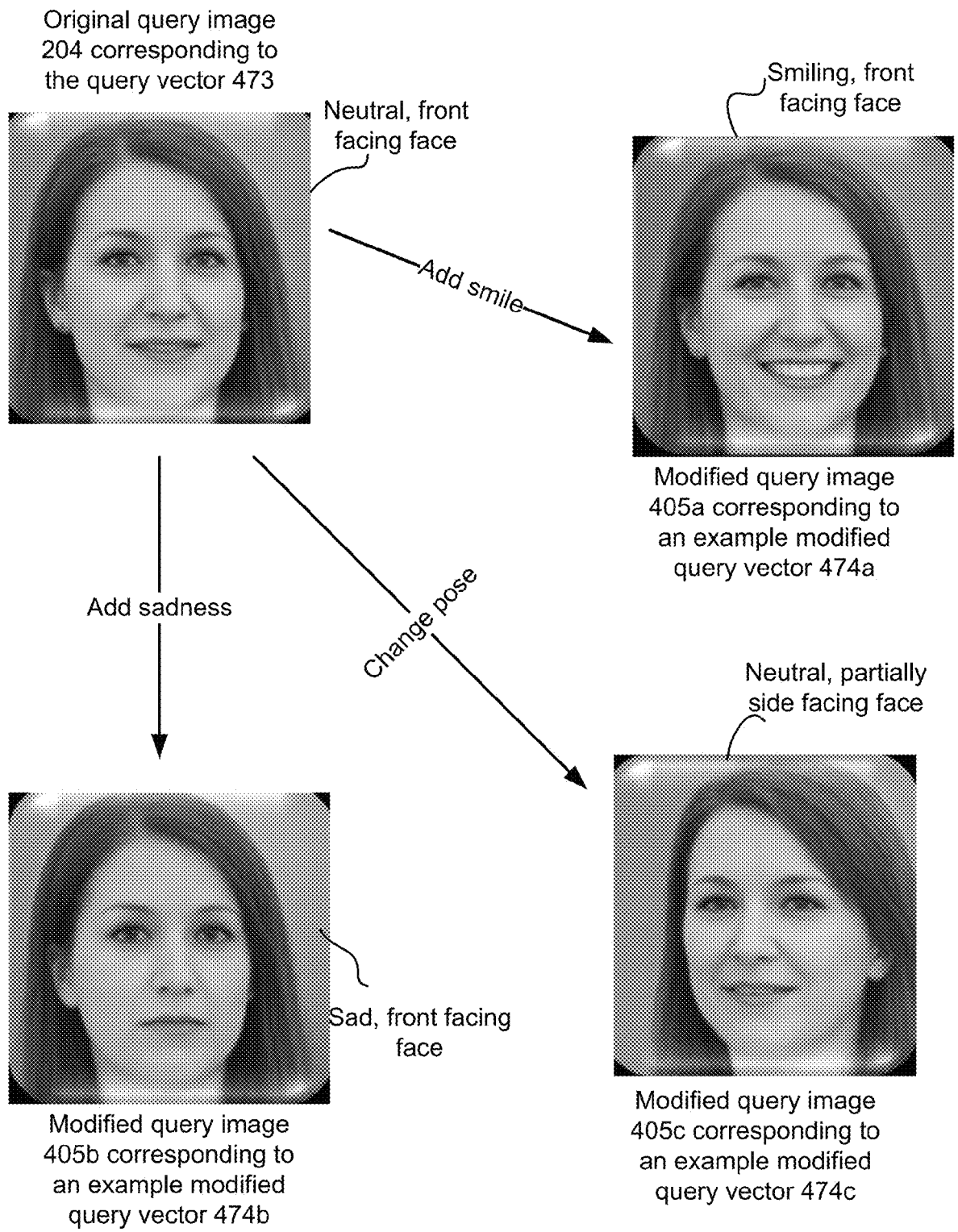
FIG. 4E illustrates example images depicting example modification operations of a query vector, in accordance with some embodiments of the present disclosure.

FIG. 4E illustrates example images depicting example modification operations of a query vector, in accordance with some embodiments of the present disclosure. For example, FIG. 4E illustrates an example original query image 404 corresponding to the query vector 473, where the original query image 204 has a front facing face with neutral expression (e.g., neither smiling, nor sad). In a first example, the query vector 473 is modified to generate a modified query vector 474a, where a modified query image 405a corresponding to the modified query vector 474a is illustrated. The modified query image 405a is generated by, for example, changing a "mood" or "facial expression" attribute from "neutral" to "smiling". Thus, the modified query image 405a has a smiling, front facing face. Note that the system 102b does not generate the modified query image 405a, and this image is illustrated in FIG. 4E merely for explanation purposes. Rather, the system 102b generates the modified query vector 474a corresponding to the modified query image 405a.

It may be noted that changing the expression from neutral to smiling does not change other attributes in the query image. This is because of orthogonality of the various attribute directions. For example, the modification in the above example is performed by moving along the attribute direction of the attribute "facial expression"— this changes the facial expression. But because the attribute direction of the attribute "facial expression" is orthogonal to other attribute directions (such as orthogonal to the attribute direction corresponding to the attribute pose), the other attributes do not differ between the images 204 and 405a. For example, both images 204 and 405a have the same pose, the same skin color, and the same hair—the only difference is the attribute "facial expression."

Similarly, in a second example modification, "sadness" is added to the original image 204, to generate a modified query vector 474b, and the corresponding modified query image 405b having a sad, front facing face is illustrated.

Similarly, in a third example modification, a "pose" attribute of the original image 204 is modified, to generate a modified query vector 474c, and the corresponding modified query image 405c having a neutral, partially side facing face is illustrated. Note that the transformation from the image 204 to the image 405c only alters the pose attribute, and does not change the facial expression or any other attribute, such as hair color.

Referring again to FIG. 3A, the method 300 then proceeds from 316 to 320, where one or more attribute directions corresponding to one or more attributes in the reduced dimensional space are identified, e.g., to generate a direction matrix F discussed herein in turn. For example, as illustrated in FIG. 4D, a distance calculation module 477 receives attribute preference values 480 corresponding to one or more attributes of the query 200, and retrieves the attribute directions corresponding to the various attributes. Note that the distance calculation module 477 receives the attribute directions 426 from the training module 108, where the attribute directions 426 are projected from the full dimensional style space W to the reduced dimension space 430 by the projection module 469.

Referring again to FIG. 3A, the method 300 then proceeds from 320 to 324, where the distance calculation module 477 calculates, for each candidate vector k, a corresponding distance $d_k$, based on (i) the identified one or more attribute directions (as identified at 320 of the method 300), (ii) the modified query vector 474, and (iii) preference values 480 associated with the one or more attribute.

For example, for an example candidate vector k (where k is 471a, ..., 471M, as illustrated in FIG. 4D), the distance $d_k$ is calculated using the following:

$$d_k = d_{kI}(w_I^q, w_I^k) + (w^q - w^k)^T . F^T . A . F . (w^q - w^k)$$  Equation 1

In equation 1, $w^q$ represents the modified query vector 474, $w^k$ represents a $k^{th}$ candidate vector 471 received by the distance calculation module 477 from the digital content database 148b, and the distance $d_k$ is a weighted distance between the modified query vector $w^q$ and the $k^{th}$ candidate vector $w^k$.

In equation 1, the first term $d_{kI}(w_I^q, w_I^k)$ represents a distance corresponding to the identity similarity between the modified query vector 474 $w^q$ and the $k^{th}$ candidate vector 471 $w^k$. For example, $w_I^q$ represents a section of the modified query vector 474 $w^q$ that represents identity information of the corresponding query image 204 (e.g., $w_I^q$ embeds identity information of the corresponding query image 204). Similarly, $w_I^k$ represents a section of the $k^{th}$ candidate vector $w^k$ that represents identity information of the corresponding candidate image 468 (e.g., $w_I^k$ embeds identity information of the corresponding $k^{th}$ candidate image). Identity information represents an identity of a person, whose face is displayed in a corresponding image. Thus, if the first term $d_{kI}(w_I^q, w_I^k)$ is small, this implies that the two faces in the query image 204 and the $k^{th}$ candidate image 468 can possibly belong to the same person (e.g., same or similar identity) or a person having a similar face. As discussed herein previously, $w_I^q$ and $w_I^k$ can be calculated either using the residual StyleGAN subspace or a face detection model. The term $d_{kI}(w_I^q, w_I^k)$ is the distance metric in this space. For example, in the residual StyleGAN subspace, the Euclidean distance can be used to calculate this distance term between these two vectors. However, in some face detection models, angular distance can also be used to calculate the identity similarity.

In equation 1, the second term $(w^q - w^k)^T . F^T . (w^q - w^k)$ represents a weighted distance between the vectors $w^q$ and $w^k$ corresponding to each attribute. For example, this term, in essence, is a summation of distances between the vectors $w^q$ and $w^k$ along the various attribute directions. The operator $(...)^T$ is a matrix transpose operator. F is a direction matrix that embeds various attribute directions. For example, a first attribute direction is embedded as a corresponding first row in the direction matrix F, a second attribute direction is embedded as a corresponding second row in the direction matrix F, and so on. Thus, each row of the direction matrix F embeds one corresponding attribute direction fi, i=1, 2, ..., Nf. Thus, the direction matrix F has Nf number of rows, where Nf is a number of attributes tracked by the system 102b, as discussed herein previously.

In an example, the matrix A of equation 1 is a weightage matrix, where the matrix A is a diagonal matrix having non-zero and/or zero diagonal entries, and having zero non-diagonal entries. The weightage matrix A is a diagonal Nf×Nf matrix, e.g., having Nf number of rows and columns. Each diagonal entry of the matrix A includes a corresponding weight αi associated with a corresponding attribute. For example, a first diagonal entry is a weight α1 associated with a corresponding first attribute, a second diagonal entry is a weight α2 associated with a corresponding second attribute, and so on. The second term $(w^q - w^k)^T . F^T . (w^q - w^k)$ can be rewritten in the vector form as:

$$(w^q - w^k)^T . F^T . (w^q - w^k) = \sum_{i=1}^{Nf} \alpha i . (f_i^T (w^q - w^k))^2$$  Equation 2

In equation 2, fi is an $i^{th}$ attribute direction, and is embedded as an $i^{th}$ row in the direction matrix F. Referring to equation 2, this term (e.g., the $i^{th}$ attribute direction fi) is weighted by the corresponding weight αi, and projected along the difference in direction $(w^q - w^k)$. The weighted projections are then summed along all attributes i=1, ..., Nf. Thus, by manipulating the values of αi, the contribution of different attributes in the distance metric can be controlled.

For example, each weight αi is based on a preference value discussed with respect to FIGS. 2A, 2B. Based on the preference value associated with an $i^{th}$ attribute (e.g., which can be set by the user, or can have a default value of 0), a corresponding weight αi is adjusted, e.g., to emphasize, ignore, or penalize an attribute.

For example, an $i^{th}$ attribute can be emphasized by setting the corresponding weight αi to be greater than zero. For example, if weight αi is set to be greater than zero (e.g., αi>0), then the corresponding attribute will contribute to the overall distance function dk, and change the search results. For example, if the face in the query image 204 is wearing glasses, and if the user wants the search results to be similar in identity and contain glasses, the weight α corresponding to the glasses is given a non-zero positive value. The higher is the preference value, the higher is the corresponding weight. Thus, the preference value corresponding to a specific attribute can be adjusted by the user, to place emphasis (or to de-emphasize) on the specific attribute during the search process. The larger is the value of the weight αi, the larger is its contribution to the overall distance and the search results. Thus, more emphasis can be placed on one or more attributes, than the identity, if desired.

For example, assume that a weight $\alpha 1$ corresponding to an attribute N1 is positive and relatively high (e.g., higher than other weights $\alpha 2$, $\alpha 3$, and so on). Then the contribution of the term $\alpha 1$. $(f_1^T(w^q-w^k))^2$ in equation 2 will be more dominant than the contribution of other terms associated with other attributes. Thus, if the $k^{th}$ candidate vector $w^k$ has the first attribute significantly different from the first attribute in the modified query vector $w^q$, then the corresponding distance dk will increase relatively significantly, making the $k^{th}$ candidate image not a good match. On the other hand, if the $k^{th}$ candidate vector $w^k$ has the first attribute similar to the first attribute in the modified query vector $w^q$, then the corresponding distance dk will decrease, making the $k^{th}$ candidate image a good match. Thus, by increasing the weight $\alpha 1$, the system 102b makes the contribution of the term $\alpha 1.(f_1^T((w^q-w^k))^2$ in equation 2 more dominant, and vice versa. Put differently, if a large preference value and a corresponding large weight is assigned to a certain attribute, its corresponding distance is magnified, and even a small increase in the distance of that particular attribute is translated into a large overall distance (e.g., making it a relatively bad result). On the other hand, if a low preference value and a corresponding small weight is assigned to the attribute, even large distances are translated into small contribution to the overall distance (e.g., thereby making the attribute less relevant in the search process).

It may be noted that the weightage matrix A can be used to emphasize (or de-emphasize) multiple attributes simultaneously. For example, a first weight $\alpha 1$ is set to a first value and a second weight $\alpha 2$ is set to a second value, thereby emphasizing corresponding first and second attributes in a different manner. Different levels of emphasis can be placed on different attributes, e.g., by ranking the attributes based on the level of corresponding importance, by appropriately setting the weights $\alpha i$ in the weightage matrix A.

In some embodiments, an attribute can be ignored during the search process, by setting the corresponding weight $\alpha i$ accordingly. For example, if a weight $\alpha i$ of an $i^{th}$ attribute is set to zero (e.g., $\alpha i=0$), then the $i^{th}$ attribute will not contribute to the overall distance function, making that attribute irrelevant in the search results. For example, if the weight corresponding to "glasses" is set to zero, the search results will not be affected by the attribute glasses. For example, FIG. 2B illustrates example search results 240 with weight $\alpha$ corresponding to glasses set to zero. Accordingly, the search results are unaffected by the attribute glasses, and some images in the search results have glasses, while some don't.

In the special case of setting all the weights to zero (e.g., $\alpha i=0$, $\forall i$), the calculated distance is simplified to identity dissimilarity (e.g., the first term $d_{kI}(w_I^q, w_I^k)$ of equation 1). Thus, in such cases, the system 102b arms to find candidate images that have same or similar identity and looks like the face in the query image 204, instead of focusing or ignoring any specific attributes.

In some embodiments, the system 102b can also provide users an ability to penalize similarity of attributes. For instance, if the user wants the search results to have a different hair color from the query image, the attribute "hair color" can be penalized. This can be achieved by setting the corresponding weight $\alpha$ to have a negative value, e.g., $\alpha<0$ (although the example use case of FIG. 2A does not illustrate any such option). In this case, the more dissimilar is the attribute in a $k^{th}$ candidate vector, the smaller is the overall distance dk.

However, in some embodiments, although an attribute can be penalized, an alternative characteristic of the attribute cannot be specified using the corresponding weight. For example, referring to FIG. 4E, the query image has a neutral face. If the attribute "neutral face" is penalized by setting the corresponding weight $\alpha$ to have a negative value, the search results can have happy face, smiling face, sad face, or another appropriate facial expression, except for a neutral face. If the user wants to have search results without neutral face, the user can set the corresponding attribute weight to have a negative value. However, if the user wants to specifically have a happy face in the search results (e.g., instead of the neutral face of the query image), this cannot be achieved by setting the corresponding weight to have a negative value (because the search results can have both happy and sad faces). Rather, the happy face search results can be achieved by modifying the query vector (e.g., to change the neutral face to the happy face), as discussed with respect to the query modification module 475 of FIGS. 4D and 4E.

Referring again to the method 300 of FIG. 3A, thus, at 324, distances dk, where k=1, . . . , M, are calculated, e.g., in accordance with equations 1 and 2. For example, as illustrated in FIG. 4D, distances 483a, . . . , 483M are calculated, corresponding to candidate vectors 471a, . . . , 471M, respectively, where each distance is generally represented as dk, where k=1, . . . , M. Subsequently, the method 300 proceeds from 324 to 328, where the system 102b (e.g., the sorting module 482) sorts the distances 483a, . . . , 483M, and selects one or more candidate vectors having lowest corresponding distances as target candidate vectors. For example, a distance dk being relatively small is indicative of the corresponding $k^{th}$ candidate vector being closer to the modified query vector, after taking into account the weightage matrix A and the direction matrix F, as discussed with respect to equations 1 and 2. Hence, one or more candidate vectors having lowest corresponding distances (e.g., among all the distances 483a, . . . , 483M) are selected as target candidate vectors.

In an example, candidate vectors having their corresponding distances lower than a threshold value are selected as the target candidate vectors. In another example, the candidate vectors are ranked based on their corresponding distances, and the lowest P number of candidate vectors are selected as the target candidate vectors, where the number P can be based on a number of search results to be displayed or desire by a user.

Subsequently, the method 300 proceeds from 328 to 332, where the system 102b causes display of one or more candidate images corresponding to the one or more target candidate vectors. Merely as an example, if candidate vectors 471a and 471d are selected at 328 (e.g., based on the corresponding distances 483a and 483d being the lowest among the distances 483a, . . . , 483M), then the system 102b causes display of corresponding candidate images 468a and 468d. For example, the system 102b communicates the candidate images 468a and 468d to the system 102a, and the search result display module 106 displays the candidate images 468a and 468d as results of the search query 200. The search results are displayed on an appropriate display, such as the display 142a of the device 100a. For example, FIG. 2B illustrates display of search results 240, 244, and 248, corresponding to different example preference and/or intensity values of various attributes.

Numerous variations and configurations will be apparent in light of this disclosure and the following examples.

Example 1. A method for performing an image search, the method comprising: receiving a query image, along with a query to initiate a search process to find other images based on the query image, the query including a preference value associated with an attribute, wherein the preference value is indicative of a level of emphasis to be placed on the attribute during the search process; generating a full query vector that is representative of the query image, the full query vector being within a first dimensional space; projecting the full query vector to a reduced dimensional space having a dimensionality lower than the first dimensional space, to generate a query vector; identifying an attribute direction in the reduced dimensional space that corresponds to the attribute, wherein a characteristic of the attribute changes along the attribute direction in the reduced dimensional space; searching a plurality of candidate vectors of the reduced dimensional space, based on (i) the attribute direction, (ii) the query vector, and (iii) the preference value associated with the attribute, to identify a target vector included in the plurality of candidate vectors, the target vector representative of a corresponding target image; and causing display of the target image.

Example 2. The method of example 1, wherein: the query further includes an intensity value associated with the attribute; and the intensity value is indicative of a characterization of the attribute that is to be searched.

Example 3. The method of example 2, further comprising: prior to searching the plurality of candidate vectors, modifying the query vector, based on the intensity value, such that the query vector, as modified, at least in part reflects the characterization of the attribute as indicated by the intensity value; wherein the plurality of candidate vectors is searched, based on the query vector after the modification.

Example 4. The method of any of examples 1-3, wherein the attribute is a first attribute, the attribute direction is a first attribute direction, and the preference value is a first preference value, and wherein the query includes a second preference value associated with a second attribute, and the method further comprises: identifying a second attribute direction in the reduced dimensional space that corresponds to the second attribute; wherein the plurality of candidate vectors is searched, further based on the (i) the second attribute direction and (ii) the second preference value.

Example 5. The method of example 4, wherein the first attribute direction corresponding to the first attribute is orthogonal to the second attribute direction corresponding to the second attribute, in the reduced dimensional space.

Example 6. The method of any of examples 4-5, wherein: the first attribute direction and the second attribute direction are embedded as corresponding rows in a direction matrix; and the first preference and the second preference are embedded as corresponding diagonal entries in a weightage matrix.

Example 7. The method of example 6, further comprising: identifying a first distance and a second distance, respectively, corresponding to a first candidate vector and a second candidate vector of the plurality of candidate vectors, wherein the first distance is based on (i) a distance between the first candidate vector and the query vector, (ii) the direction matrix, and (iii) the weightage matrix, and wherein the second distance is based on (i) a distance between the second candidate vector and the query vector, (ii) the direction matrix, and (iii) the weightage matrix; and identifying the first candidate vector, and not the second candidate vector, as the target vector during the search, in response to the first distance being less than a threshold and the second distance being greater than the threshold, and/or in response to the first distance being less than the second distance.

Example 8. The method of any of examples 1-7, further comprising: for each candidate image of a plurality of candidate images, generating a corresponding full candidate vector of the first dimensional space, to provide a plurality of full candidate vectors; and projecting each full candidate vector to the reduced dimensional space, to generate a corresponding candidate vector, such that the plurality of candidate vectors is generated corresponding to the plurality of candidate images.

Example 9. The method of any of examples 1-8, further comprising: for each training image of a plurality of training images, generating a corresponding training vector of the first dimensional space, to provide a plurality of training vectors; and using the training vectors, training a machine learning module to assign, to each of a plurality of attributes, a corresponding attribute direction of a plurality of attribute directions within the first dimensional space, such that (i) at least one attribute direction of the plurality of attribute directions is orthogonal to at least one or more other attribute directions, and (ii) one or more attribute directions of the plurality of attribute directions has a sparsity below a threshold level.

Example 10. The method of example 9, further comprising: generating a matrix comprising at least sections of the plurality of training vectors; performing a singular value decomposition (SVD) of the matrix, to identify a plurality of singular vectors associated with the matrix; identifying one or more dominant singular vectors from the plurality of singular vectors; and identifying the reduced dimensional space, based on (i) the plurality of attribute directions and (ii) the one or more dominant singular vectors.

Example 11. The method of example 10, wherein at least sections of the plurality of training vectors used to generate the matrix comprises a representation of a full training vector in a subspace that is not spanned by the plurality of attribute directions.

Example 12. The method of any of examples 1-10, wherein generating the full query vector comprises: using an encoder, which implements an inverse function of at least a section of a Style Generative Adversarial Network (Style-GAN), to generate the full query vector from the query image.

Example 13. A system for searching images based on a query image, the system comprising: one or more processors; an image search system executable by the one or more processors to receive the query image, along with a query to initiate a search process to find other images based on the query image, the query comprising (i) an identification of an attribute, (ii) a preference value indicating a level of emphasis to be placed on the attribute during the search, and (iii) an intensity value indicating a characterization of the attribute during the search process, generate a query vector representative of the query image, modify the query vector based on the intensity value, such that the query vector, as modified, at least in part reflects the characterization of the attribute as indicated by the intensity value, search a plurality of candidate search vectors, based on (i) the query vector as modified, and (ii) the preference value associated with the attribute, to identify a target search vector corresponding to a target image within a search database; and cause display of the target image.

Example 14. The system of example 13, wherein the image search system is further to: identify an attribute direction in the reduced dimensional space that corresponds to the attribute; and search the plurality of candidate search vectors, based further on the attribute direction.

Example 15. The system of any of examples 13-14, wherein the image search system is further to: generate the query vector representative of the query image, such that the query vector is in a first space having a first dimension; and prior to modifying the query vector, project the query vector is a second space having a second dimension that is less than the first dimension.

Example 16. The system of any of examples 13-15, wherein the image search system is further to: identify the second space having the second dimension, such that the projected query vector in the second dimension retains substantially all attribute information of the query vector in the first space having the first dimension.

Example 17. A computer program product including one or more non-transitory machine-readable mediums encoded with instructions that when executed by one or more processors cause a process to be carried out, the process comprising: for each training image of a plurality of training images, generating a corresponding training vector of a first dimensional space, to provide a plurality of training vectors; and using the plurality of training vectors, training a machine learning module to assign, to each of a plurality of attributes, a corresponding attribute direction of a plurality of attribute directions within the first dimensional space, such that (i) at least one attribute direction of the plurality of attribute directions is orthogonal to at least one or more other attribute directions, and (ii) one or more attribute directions of the plurality of attribute directions has a sparsity below a threshold level; wherein a characteristics of a first attribute changes along a corresponding first attribute direction, and wherein a characteristics of a second attribute does not change along the first attribute direction.

Example 18. The method of example 17, further comprising: generating a training vector matrix comprising the plurality of training vectors; performing a singular value decomposition (SVD) of at least a section of the training vector matrix, to identify a plurality of singular vectors; identifying one or more dominant singular vectors from the plurality of singular vectors; and identifying a reduced dimensional space, based on (i) the plurality of attribute directions and (ii) the one or more dominant singular vectors, the reduced dimensional space having a lower dimensionality than the first dimensional space.

Example 19. The method of example 18, wherein after the machine learning module is trained, the process further comprises: receiving a query image, along with a query to initiate a search process to find other images based on the query image, the query including a preference value associated with the first attribute, wherein the preference value is indicative of a level of emphasis to be placed on the first attribute during the search process; generating a full query vector in the first dimensional space, the full query vector representative of the query image; projecting the full query vector to the reduced dimensional space, to generate a query vector; searching a plurality of candidate vectors of the reduced dimensional space, based on (i) the first attribute direction, (ii) the query vector, and (iii) the preference value, to identify one or more target vectors from the plurality of candidate vectors; and causing display of one or more images that correspond to the identified one or more target vectors.

Example 20. The method of example 19, wherein the query further includes an intensity value associated with the first attribute, the intensity value is indicative of a characterization of the first attribute that is to be searched, and wherein the process further comprises: prior to searching the plurality of candidate vectors, modifying the query vector, based on the intensity value, such that the query vector, as modified, at least in part reflects the characterization of the first attribute as indicated by the intensity value; wherein the plurality of candidate vectors is searched, based on the query vector after the modification.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for performing an image search, the method comprising:
    receiving a query image, along with a query to initiate a search process to find other images based on the query image, the query including a first preference value associated with a first attribute and a second preference value associated with a second attribute, wherein the first preference value is indicative of a first level of emphasis to be placed on the first attribute during the search process, and wherein the second preference value is indicative of a second level of emphasis to be placed on the second attribute during the search process;
    generating a full query vector that is representative of the query image, the full query vector being within a first dimensional space, wherein the full query vector is generated by implementing an inverse function of at least a section of a generative adversarial network;
    projecting the full query vector to a reduced dimensional space having a dimensionality lower than the first dimensional space, to generate a query vector;
    identifying a first attribute direction in the reduced dimensional space that corresponds to the first attribute, wherein a characteristic of the first attribute changes along the first attribute direction in the reduced dimensional space;
    identifying a second attribute direction in the reduced dimensional space that corresponds to the second attribute, wherein a characteristic of the second attribute changes along the second attribute direction in the reduced dimensional space, and wherein the first attribute direction and the second attribute direction are embedded as corresponding rows in a direction matrix;
    identifying a first distance that corresponds to a first candidate vector of a plurality of candidate vectors of the reduced dimensional space, wherein the first distance is based on (i) the first attribute direction, (ii) the query vector, and (iii) a weightage matrix that embeds the first preference value and the second preference value;
    identifying a second distance that corresponds to a second candidate vector of the plurality of candidate vectors of the reduced dimensional space, wherein the second distance is based on (i) the second attribute direction, (ii) the query vector, and (iii) the weightage matrix;
    identifying the first candidate vector as a target vector in response to the first distance being less than a threshold distance, the target vector representative of a corresponding target image; and causing display of the target image.

2. The method of claim 1, wherein:

the query further includes an intensity value associated with the first attribute; and the intensity value is indicative of a characterization of the first attribute that is to be searched.

3. The method of claim 2, further comprising:

modifying the query vector, based on the intensity value, such that the query vector, as modified, at least in part reflects the characterization of the first attribute as indicated by the intensity value;

wherein the first candidate vector and the second candidate vector are identified based on the query vector after modification.

4. The method of claim 1, wherein the method further comprises: searching the plurality of candidate vectors to identify the first candidate vector and the second candidate vector.

5. The method of claim 1, wherein the first attribute direction is orthogonal to the second attribute direction in the reduced dimensional space.

6. The method of claim 1, wherein: the first preference value and the second preference value are embedded as corresponding diagonal entries in the weightage matrix.

7. The method of claim 6, wherein:

the second candidate vector is not identified as the target vector; and the second distance is greater than the threshold distance and/or is greater than the first distance.

8. The method of claim 1, further comprising:

for each candidate image of a plurality of candidate images, generating a corresponding full candidate vector of the first dimensional space, to provide a plurality of full candidate vectors; and projecting each full candidate vector to the reduced dimensional space, to generate one of the plurality of candidate vectors.

9. The method of claim 1, further comprising: training a machine learning module to assign, to each of a plurality of attributes, including the first attribute and the second attribute, a corresponding attribute direction of a plurality of attribute directions, including the first attribute direction and the second attribute direction, within the first dimensional space, such that one or more attribute directions of the plurality of attribute directions has a sparsity below a threshold level.

10. The method of claim 9, further comprising:

generating a training matrix comprising at least sections of a plurality of training vectors;

performing a singular value decomposition (SVD) of the training matrix, to identify a plurality of singular vectors associated with the training matrix;

identifying one or more dominant singular vectors from the plurality of singular vectors; and identifying the reduced dimensional space, based on (i) the plurality of attribute directions and (ii) the one or more dominant singular vectors.

11. The method of claim 10, wherein the sections of the plurality of training vectors used to generate the training matrix comprise a representation of a full training vector in a subspace that is not spanned by the plurality of attribute directions.

12. The method of claim 1, wherein the full query vector is generated using an encoder, and wherein the generative adversarial network is a Style Generative Adversarial Network (StyleGAN).

13. A system for performing an image search, the system comprising:

a memory;

one or more processors; and an image search system executable by the one or more processors to receive a query image, along with a query to initiate a search process to find other images based on the query image, the query including a first preference value associated with a first attribute and a second preference value associated with a second attribute, wherein the first preference value is indicative of a first level of emphasis to be placed on the first attribute during the search process, and wherein the second preference value is indicative of a second level of emphasis to be placed on the second attribute during the search process;

generate a full query vector that is representative of the query image, the full query vector being within a first dimensional space, wherein the full query vector is generated by implementing an inverse function of at least a section of a generative adversarial network;

project the full query vector to a reduced dimensional space having a dimensionality lower than the first dimensional space, to generate a query vector;

identify a first attribute direction in the reduced dimensional space that corresponds to the first attribute, wherein a characteristic of the first attribute changes along the first attribute direction in the reduced dimensional space;

identify a second attribute direction in the reduced dimensional space that corresponds to the second attribute, wherein a characteristic of the second attribute changes along the second attribute direction in the reduced dimensional space, and wherein the first attribute direction and the second attribute direction are embedded as corresponding rows in a direction matrix;

identify a first distance that corresponds to a first candidate vector of a plurality of candidate vectors of the reduced dimensional space, wherein the first distance is based on (i) the first attribute direction, (ii) the query vector, and (iii) a weightage matrix that embeds the first preference value and the second preference value;

identify a second distance that corresponds to a second candidate vector of the plurality of candidate vectors of the reduced dimensional space, wherein the second distance is based on (i) the second attribute direction, (ii) the query vector, and (iii) the weightage matrix;

identify the first candidate vector as a target vector in response to the first distance being less than a threshold distance, the target vector representative of a corresponding target image; and cause display of the target image.

14. The system of claim 13, wherein:

the query further includes an intensity value associated with the first attribute; and the intensity value is indicative of a characterization of the first attribute that is to be searched.

15. The system of claim 14, wherein:

the image search system is further executable by the one or more processors to modify the query vector, based on the intensity value, such that the query vector, as modified, at least in part reflects the characterization of the first attribute as indicated by the intensity value; and the first candidate vector and the second candidate vector are identified based on the query vector after modification.

16. The system of claim 13, wherein the first attribute direction is orthogonal to the second attribute direction in the reduced dimensional space.

17. A computer program product including one or more non-transitory machine-readable mediums encoded with instructions that, when executed by one or more processors, cause a process to be carried out, the process comprising:
receiving a query image, along with a query to initiate a search process to find other images based on the query image, the query including a first preference value associated with a first attribute and a second preference value associated with a second attribute, wherein the first preference value is indicative of a first level of emphasis to be placed on the first attribute during the search process, and wherein the second preference value is indicative of a second level of emphasis to be placed on the second attribute during the search process;
generating a full query vector that is representative of the query image, the full query vector being within a first dimensional space, wherein the full query vector is generated by implementing an inverse function of at least a section of a generative adversarial network;
projecting the full query vector to a reduced dimensional space having a dimensionality lower than the first dimensional space, to generate a query vector;
identifying a first attribute direction in the reduced dimensional space that corresponds to the first attribute, wherein a characteristic of the first attribute changes along the first attribute direction in the reduced dimensional space;
identifying a second attribute direction in the reduced dimensional space that corresponds to the second attribute, wherein a characteristic of the second attribute changes along the second attribute direction in the reduced dimensional space, and wherein the first attribute direction and the second attribute direction are embedded as corresponding rows in a direction matrix;
identifying a first distance that corresponds to a first candidate vector of a plurality of candidate vectors of the reduced dimensional space, wherein the first distance is based on (i) the first attribute direction, (ii) the query vector, and (iii) a weightage matrix that embeds the first preference value and the second preference value;
identifying a second distance that corresponds to a second candidate vector of the plurality of candidate vectors of the reduced dimensional space, wherein the second distance is based on (i) the second attribute direction, (ii) the query vector, and (iii) the weightage matrix;
identifying the first candidate vector as a target vector in response to the first distance being less than a threshold distance, the target vector representative of a corresponding target image; and
causing display of the target image.

18. The computer program product of claim 17, wherein the first preference value and the second preference value are embedded as corresponding diagonal entries in the weightage matrix.

19. The computer program product of claim 18, wherein:
the second candidate vector is not identified as the target vector; and
the second distance is greater than the threshold distance and/or is greater than the first distance.

20. The computer program product of claim 17, wherein the process further comprises:
for each candidate image of a plurality of candidate images, generating a corresponding full candidate vector of the first dimensional space, to provide a plurality of full candidate vectors; and
projecting each full candidate vector to the reduced dimensional space, to generate one of the plurality of candidate vectors.

\* \* \* \* \*